(12) United States Patent
Pfleger et al.

(10) Patent No.: US 12,265,931 B2
(45) Date of Patent: Apr. 1, 2025

(54) OPTIMIZED COORDINATION AND SCHEDULING OF USE OF EQUIPMENT AND RESOURCES WITHIN WORK ENVIRONMENT

(71) Applicant: AGILENT TECHNOLOGIES, INC., Santa Clara, CA (US)

(72) Inventors: Michael Pfleger, Santa Clara, CA (US); Theo Schwemer, Santa Clara, CA (US)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 275 days.

(21) Appl. No.: 17/764,924

(22) PCT Filed: Nov. 30, 2020

(86) PCT No.: PCT/US2020/062619
§ 371 (c)(1),
(2) Date: Mar. 29, 2022

(87) PCT Pub. No.: WO2021/118823
PCT Pub. Date: Jun. 17, 2021

(65) Prior Publication Data
US 2022/0374816 A1    Nov. 24, 2022

Related U.S. Application Data

(60) Provisional application No. 62/945,381, filed on Dec. 9, 2019.

(51) Int. Cl.
*G06Q 10/00* (2023.01)
*G06Q 10/0631* (2023.01)

(52) U.S. Cl.
CPC ........... *G06Q 10/063114* (2013.01); *G06Q 10/06316* (2013.01)

(58) Field of Classification Search
CPC ............................ G06Q 10/00–50/00
(Continued)

(56) References Cited

U.S. PATENT DOCUMENTS 5,233,533 A * 8/1993 Edstrom ............... G06Q 10/06
700/103
10,317,870 B1    6/2019 Burnett et al.
(Continued)

OTHER PUBLICATIONS

International Search Report and Written Opinion for PCT Patent Application No. PCT/US2020/062619, filed Nov. 30, 2020, mailed on Feb. 11, 2021, European Patent Office, 16 pages.

*Primary Examiner* — Mustafa Iqbal

(57) ABSTRACT

Novel tools and techniques are provided for implementing optimized scheduling of tasks involving equipment used by multiple individuals. In various embodiments, a computing system might receive, from a first user, a first request to use first equipment that is disposed in a work environment, the first request comprising information regarding a first task to be performed using the first equipment. The computing system might determine a core processing time during which the requested first equipment performs core processes involved with performing the first task, might determine a pre-processing time and a post-processing time involved with performance of the first task. The computing system might determine an estimated total processing time to complete the first task using the first equipment, based on the determined core processing time, pre-processing time, and post-processing time. The computing system might display the estimated total processing time to complete the first task using the first equipment.

19 Claims, 14 Drawing Sheets

(58) Field of Classification Search
USPC ............................................. 705/7.11–7.42
See application file for complete search history.

(56) References Cited

U.S. PATENT DOCUMENTS

| | | |
|---|---|---|
| 2009/0063258 A1 | 3/2009 | Mueller et al. |
| 2009/0089092 A1* | 4/2009 | Johnson ................ G06Q 10/06 705/2 |
| 2010/0299172 A1* | 11/2010 | Nottoli ................. G06F 3/0483 705/29 |
| 2014/0281712 A1 | 9/2014 | Subbu et al. |
| 2016/0300175 A1* | 10/2016 | Talmaki ........... G06Q 10/06315 |
| 2020/0219037 A1* | 7/2020 | Pike ............... G06Q 10/063114 |
| 2022/0172279 A1* | 6/2022 | O'Leary ................ G06Q 10/02 |

* cited by examiner

Sample Schedule

Next available instrument: Instrument 2 (Available at about 3:43 p.m.)

| Instrument | User | Identifier | Sample Name | Acquisition Method | Status | Estimated Pre-Processing Time (min) | Estimated Core Processing Time (min) | Estimated Post-Processing Time (min) | Estimated Total Processing Time (min) |
|---|---|---|---|---|---|---|---|---|---|
| Instrument 1 | | TOTAL CURRENT OVERALL TIME: | 8 hours 31 minutes | (Next Available at about 4:44 p.m.) | | | | | |
| Instrument 1 | | | | Method 1 | | 16.67 (Avg.) | 59.00 (Avg.) | 9.33 (Avg.) | 85.00 (Avg.) |
| Instrument 1 | User 1 | user01_2019-04-12_0750 | Sample 1 | Method 1 | In Progress | 20 | 59 | 10 | 89 |
| Instrument 1 | User 2 | user02_2019-04-12_0821 | Sample 1 | Method 2 | In Queue | 17 | 52 | 10 | 79 |
| Instrument 1 | User 3 | user03_2019-04-12_1012 | Sample 1 | Method 3 | In Queue | 15 | 73 | 9 | 97 |
| Instrument 1 | User 4 | user04_2019-04-12_1035 | Sample 2 | Method 1 | In Queue | 16 | 59 | 8 | 83 |
| Instrument 1 | User 5 | user05_2019-04-12_1104 | Sample 3 | Method 2 | In Queue | 15 | 52 | 9 | 76 |
| Instrument 1 | User 6 | user06_2019-04-12_1250 | Sample 3 | Method 1 | In Queue | 17 | 59 | 10 | 86 |
| Instrument 1 | | | | | | | | | |
| Instrument 2 | | TOTAL CURRENT OVERALL TIME: | 7 hours 30 minutes | (Next Available at about 3:43 p.m.) | | | | | |
| Instrument 2 | | | | All Methods | | 16.00 (Avg.) | 65.00 (Avg.) | 9.00 (Avg.) | 90.00 (Avg.) |
| Instrument 2 | User 7 | user07_2019-04-12_0813 | Sample 4 | Method 4 | In Progress | 20 | 82 | 7 | 109 |
| Instrument 2 | User 8 | user08_2019-04-12_0925 | Sample 5 | Method 2 | In Queue | 15 | 52 | 10 | 77 |
| Instrument 2 | User 8 | user08_2019-04-12_1053 | Sample 6 | Method 1 | In Queue | 16 | 59 | 9 | 84 |
| Instrument 2 | User 9 | user09_2019-04-12_1127 | Sample 7 | Method 3 | In Queue | 13 | 73 | 8 | 94 |
| Instrument 2 | User 10 | user10_2019-04-12_1251 | Sample 8 | Method 1 | In Queue | 16 | 59 | 11 | 86 |

OPTIMIZED COORDINATION AND SCHEDULING OF USE OF EQUIPMENT AND RESOURCES WITHIN WORK ENVIRONMENT

CROSS-REFERENCES TO RELATED APPLICATIONS

This application is a national stage filing under 35 U.S.C 371 of PCT application number PCT/US2020/062619, having an international filing date of Nov. 30, 2020, which claims priority to U.S. Patent Application Ser. No. 62/945,381 (the "'381 application"), filed Dec. 9, 2019 by Michael Pfleger et al., entitled, "Optimized Coordination and Scheduling of Use of Equipment and Resources Within Work Environment," the disclosure of which is incorporated herein by reference in its entirety for all purposes.

The respective disclosures of these applications/patents (which this document refers to collectively as the "Related Applications") are incorporated herein by reference in their entirety for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to methods, systems, and apparatuses for implementing task scheduling, and, more particularly, to methods, systems, and apparatuses for implementing optimized scheduling of tasks involving equipment used by multiple individuals.

BACKGROUND

Conventional data systems only show a subset of the total required time for a measurement. Typically, only the core actual measurement time is shown to the user, and, at best, an estimated preparation time may be added. This leads to an unprecise prediction of the total required time for the measurement. However, the time when an instrument becomes available for new tasks cannot be provided with relevant confidence.

Hence, there is a need for more robust and scalable solutions for implementing task scheduling, and, more particularly, to methods, systems, and apparatuses for implementing optimized scheduling of tasks involving equipment used by multiple individuals.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

FIG. 3A is a schematic diagram illustrating a non-limiting example of a software interface, a web interface, a pop-up window, or other user interface that may be used for displaying estimated processing times and availability of equipment as a result of implementing optimized scheduling of tasks involving equipment used by multiple individuals, in accordance with various embodiments.

DETAILED DESCRIPTION OF CERTAIN EMBODIMENTS

Overview

Figure 1:
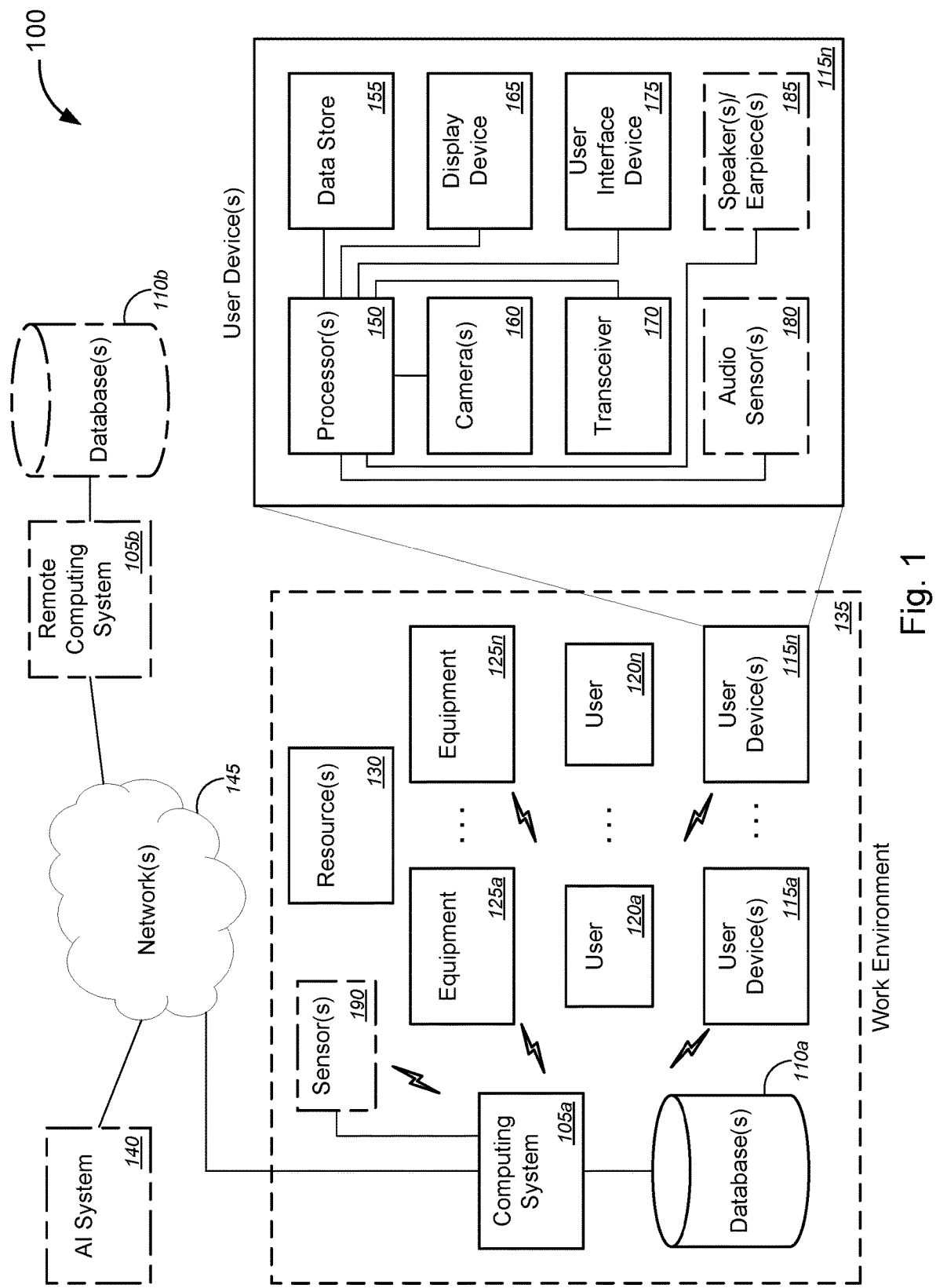
FIG. 1 is a schematic diagram illustrating a system for implementing optimized scheduling of tasks involving equipment used by multiple individuals, in accordance with various embodiments.

Various embodiments provide tools and techniques for implementing task scheduling, and, more particularly, to methods, systems, and apparatuses for implementing optimized scheduling of tasks involving equipment used by multiple individuals.

In various embodiments, a computing system might receive, from a first user, a first request to use first equipment that is disposed in a work environment, the first request comprising information regarding a first task to be performed using the first equipment. The computing system might determine a core processing time during which the requested first equipment performs core processes involved with performing the first task. The computing system might determine a pre-processing time involved with performance of the first task using the first equipment, in some cases, based at least in part on at least one of one or more prior pre-processing times for performance of the first task on similar equipment, one or more prior pre-processing times for performance of the first task using the first equipment, one or more prior pre-processing times for performance of the first task by the first user using similar equipment, or one or more prior pre-processing times for performance of the first task by the first user using the first equipment, and/or the like. The computing system might determine a post-processing time involved with performance of the first task using the first equipment, in some cases, based at least in part on at least one of one or more prior post-processing times for performance of the first task on similar equipment, one or more prior post-processing times for performance of the first task using the first equipment, one or more prior post-processing times for performance of the first task by the first user using similar equipment, or one or more prior post-processing times for performance of the first task by the first user using the first equipment, and/or the like. The computing system might determine an estimated total processing time to complete the first task using the first equipment, based on the determined core processing time, the determined pre-processing time, and the determined post-processing time. The computing system might display, to the first user on a display device, the estimated total processing time to complete the first task using the first equipment.

In some embodiments, the computing system might comprise one of a computing system that is integrated with the first equipment, a computing system disposed in the work environment, a remote computing system disposed external to the work environment and accessible over a network, or a cloud computing system, and/or the like. In some cases, the display device might comprise one of a monitor that is communicatively coupled to the first equipment, a monitor that is communicatively coupled to the computing system, a display device that is disposed in the work environment, a display device of a laptop computer that is used by the first user, a display device of a tablet computer that is used by the first user, a display device of a smart phone that is used by the first user, a display device of a mobile phone that is used by the first user, or a display device of an augmented reality ("AR") headset that is worn by the first user, and/or the like. In some instances, the work environment might comprise one of a laboratory, a clinic, an office, a construction site, a machine shop, a workshop, a factory, or a room, and/or the like.

According to some embodiments, the first task might include, but is not limited to, one of running a test sample or a tissue sample using laboratory instrumentation, solving a puzzle, assembling a piece of machinery, assembling an object, preparing a test sample or a tissue sample, identifying or tracking samples within a laboratory, instructing or guiding users regarding how to perform experimental protocols or tests in a laboratory, performing processes in a histology laboratory, performing processes in a pathologist's office, performing tasks after slide diagnosis, performing processes in a clinical or analytical laboratory, or transferring reagents or samples, and/or the like.

In some cases, the laboratory instrumentation might comprise at least one of an automated clinical chemistry system, a centrifuge, a Raman spectroscopy system, an electrophoresis system, an ion mobility spectrometry ("IMS") system, a mass spectrometry ("MS") system, an inductively coupled plasma mass spectrometry ("ICP-MS") system, a gas chromatography ("GC") system, a gas chromatography mass spectrometry ("GC/MS") system, a liquid chromatography ("LC") system, a high-performance liquid chromatography ("HPLC") system, a liquid chromatography mass spectrometry ("LC/MS") system, an inductively coupled plasma atomic emission spectrometry ("ICP-AES") system, an inductively coupled plasma optical emission spectrometry ("ICP-OES") system, an atomic absorption spectrometry ("AAS") system, a microwave plasma atomic emission spectrometry ("MP-AES") system, a laser direct infrared imaging ("LDIR") system, an ultraviolet-visible ("UV-Vis") spectrophotometry system, an ultraviolet-visible-near infrared ("UV-Vis-NIR") spectrophotometry system, an electron microscopy system, a microarray scanner, a polymerase chain reaction ("PCR") instrument, a sequencing system, a cytometry system, a cell analysis system, a fluorescence and chromogenic in situ hybridization-based ("FISH/ISH") system, a sample staining system, a sample preparation system, a high vacuum system, a microlithography system, a nanolithography system, a chemical vapor deposition ("CVD") system, an ion-beam etching system, a sputtering system, an ion-beam implantation system, or a molecular beam-epitaxy system, and/or the like.

Merely by way of example, in some instances, at least one of determining the core processing time, determining the pre-processing time, or determining the post-processing time may be performed using at least one of an AI system, a machine learning system, a learning algorithm-based system, or a neural network system, and/or the like, to enhance computational processing by the computing system.

In some embodiments, the first task might comprise running a sample using laboratory instrumentation. In some cases, the pre-processing time might comprise time during which at least one of the following processes occur: instrument conditioning of the first equipment, warming up of the first equipment, transferring the sample from a container to a sample preparation system, preparation of the sample using the sample preparation system, transferring the sample to the first equipment, or configuring the first equipment to perform the first task, and/or the like. Alternatively, or additionally, the post-processing time might comprise time during which at least one of the following processes occur: transferring the sample to a container after completing the first task, cleaning the first equipment, or transferring or saving data obtained during the first task, and/or the like.

The approach utilized by the various embodiments might allow a significantly improved prediction of the total duration of a measurement process. The described solution might also react on changing factors over time. Effects like aging of system components that might influence the total time might be properly considered after an automatic adjustment period. The approach does not require the knowledge of all factors that impact the measurement time and the relevance of their impact. By using the approach that is described herewith, any software that runs measurements, like chromatography data systems run chemical analysis, tasks that are either controlled by the software itself or even tasks that get performed outside the software. Such software might also be able to precisely predict the availability of an instrument by estimating the required processing time of already queued measurements.

These and other aspects of the system and functionality for optimized scheduling of tasks involving equipment used by multiple individuals are described in greater detail with respect to the figures. In some aspects, the system and functionality for optimized scheduling of tasks involving equipment used by multiple individuals may also be integrated with a smart lab, content management, or lab workflow management systems, such as, but not limited to, Agilent OpenLab® or other similar software suite, or the like.

The following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present invention may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Various embodiments described herein, while embodying (in some cases) software products, computer-performed methods, and/or computer systems, represent tangible, concrete improvements to existing technological areas, including, without limitation, scheduling technology, sample scheduling technology, laboratory scheduling technology, instrument coordination technology, and/or the like. In other aspects, certain embodiments, can improve the functioning of user equipment or systems themselves (e.g., scheduling system, sample scheduling system, laboratory scheduling system, instrument coordination system, etc.), for example, by receiving, with a computing system and from a first user, a first request to use first equipment that is disposed in a work environment, the first request comprising information regarding a first task to be performed using the first equipment; determining, with the computing system, a core processing time during which the requested first equipment performs core processes involved with performing the first task; determining, with the computing system, a pre-processing time involved with performance of the first task using the first equipment, based at least in part on at least one of one or more prior pre-processing times for performance of the first task on similar equipment, one or more prior pre-processing times for performance of the first task using the first equipment, one or more prior pre-processing times for performance of the first task by the first user using similar equipment, or one or more prior pre-processing times for performance of the first task by the first user using the first equipment; determining, with the computing system, a post-processing time involved with performance of the first task using the first equipment, based at least in part on at least one of one or more prior post-processing times for performance of the first task on similar equipment, one or more prior post-processing times for performance of the first task using the first equipment, one or more prior post-processing times for performance of the first task by the first user using similar equipment, or one or more prior post-processing times for performance of the first task by the first user using the first equipment; determining, with the computing system, an estimated total processing time to complete the first task using the first equipment, based on the determined core processing time, the determined pre-processing time, and the determined post-processing time; and displaying, with the computing system and to the first user on a display device, the estimated total processing time to complete the first task using the first equipment; and/or the like.

In particular, to the extent any abstract concepts are present in the various embodiments, those concepts can be implemented as described herein by devices, software, systems, and methods that involve specific novel functionality (e.g., steps or operations), such as, receiving, with a computing system and from a first user, a first request to use first equipment that is disposed in a work environment, the first request comprising information regarding a first task to be performed using the first equipment; determining, with the computing system, a core processing time during which the requested first equipment performs core processes involved with performing the first task; determining, with the computing system, a pre-processing time involved with performance of the first task using the first equipment, based at least in part on at least one of one or more prior pre-processing times for performance of the first task on similar equipment, one or more prior pre-processing times for performance of the first task using the first equipment, one or more prior pre-processing times for performance of the first task by the first user using similar equipment, or one or more prior pre-processing times for performance of the first task by the first user using the first equipment; determining, with the computing system, a post-processing time involved with performance of the first task using the first equipment, based at least in part on at least one of one or more prior post-processing times for performance of the first task on similar equipment, one or more prior post-processing times for performance of the first task using the first equipment, one or more prior post-processing times for performance of the first task by the first user using similar equipment, or one or more prior post-processing times for performance of the first task by the first user using the first equipment; determining, with the computing system, an estimated total processing time to complete the first task using the first equipment, based on the determined core processing time, the determined pre-processing time, and the determined post-processing time; and displaying, with the computing system and to the first user on a display device, the estimated total processing time to complete the first task using the first equipment; and/or the like, to name a few examples, that extend beyond mere conventional computer processing operations. These functionalities can produce tangible results outside of the implementing computer system, including, merely by way of example, optimized scheduling and management of tasks involving equipment used by multiple individuals, improvement of runtime estimations, improvement in the estimation of runtimes for queues, improvement of lab performance, and/or the like, at least some of which may be observed or measured by customers and/or service providers.

In an aspect, a method might comprise receiving, with a computing system and from a first user, a first request to use first equipment that is disposed in a work environment, the first request comprising information regarding a first task to be performed using the first equipment; determining, with the computing system, a core processing time during which the requested first equipment performs core processes involved with performing the first task. The method might also comprise determining, with the computing system, a pre-processing time involved with performance of the first task using the first equipment, based at least in part on at least one of one or more prior pre-processing times for performance of the first task on similar equipment, one or more prior pre-processing times for performance of the first task using the first equipment, one or more prior pre-processing times for performance of the first task by the first user using similar equipment, or one or more prior pre-processing times for performance of the first task by the first user using the first equipment; and determining, with the computing system, a post-processing time involved with performance of the first task using the first equipment, based at least in part on at least one of one or more prior post-processing times for performance of the first task on similar equipment, one or more prior post-processing times for performance of the first task using the first equipment, one or more prior post-processing times for performance of the first task by the first user using similar equipment, or one or more prior post-processing times for performance of the first task by the first user using the first equipment. The method might further comprise determining, with the computing system, an estimated total processing time to complete the first task using the first equipment, based on the determined core processing time, the determined pre-processing time, and the determined post-processing time; and displaying, with the computing system and to the first user on a display device, the estimated total processing time to complete the first task using the first equipment.

In another aspect, a method might comprise receiving, with a computing system and from a first user, a first request to use first equipment that is disposed in a work environment, the first request comprising information regarding a first task to be performed using the first equipment; determining, with the computing system, a core processing time during which the requested first equipment performs core processes involved with performing the first task; determining, with the computing system, a pre-processing time involved with performance of the first task using the first equipment; determining, with the computing system, a post-processing time involved with performance of the first task using the first equipment; determining, with the computing system, an estimated total processing time to complete the first task using the first equipment, based on the determined core processing time, the determined pre-processing time, and the determined post-processing time; and displaying, with the computing system and to the first user on a display device, the estimated total processing time to complete the first task using the first equipment.

In some embodiments, the computing system might comprise one of a computing system that is integrated with the first equipment, a computing system disposed in the work environment, a remote computing system disposed external to the work environment and accessible over a network, or a cloud computing system, and/or the like.

In some cases, the display device might comprise one of a monitor that is communicatively coupled to the first equipment, a monitor that is communicatively coupled to the computing system, a display device that is disposed in the work environment, a display device of a laptop computer that is used by the first user, a display device of a tablet computer that is used by the first user, a display device of a smart phone that is used by the first user, a display device of a mobile phone that is used by the first user, or a display device of an augmented reality ("AR") headset that is worn by the first user, and/or the like. In some instances, the work environment might comprise one of a laboratory, a clinic, an office, a construction site, a machine shop, a workshop, a factory, or a room, and/or the like.

Merely by way of example, in some cases, the first task might comprise one of running a test sample or a tissue sample using laboratory instrumentation, solving a puzzle, assembling a piece of machinery, assembling an object, preparing a test sample or a tissue sample, identifying or tracking samples within a laboratory, instructing or guiding users regarding how to perform experimental protocols or tests in a laboratory, performing processes in a histology laboratory, performing processes in a pathologist's office, performing tasks after slide diagnosis, performing processes in a clinical or analytical laboratory, or transferring reagents or samples, and/or the like. In some instances, the laboratory instrumentation might comprise at least one of an automated clinical chemistry system, a centrifuge, a Raman spectroscopy system, an electrophoresis system, an ion mobility spectrometry ("IMS") system, a mass spectrometry ("MS") system, an inductively coupled plasma mass spectrometry ("ICP-MS") system, a gas chromatography ("GC") system, a gas chromatography mass spectrometry ("GC/MS") system, a liquid chromatography ("LC") system, a high-performance liquid chromatography ("HPLC") system, a liquid chromatography mass spectrometry ("LC/MS") system, an inductively coupled plasma atomic emission spectrometry ("ICP-AES") system, an inductively coupled plasma optical emission spectrometry ("ICP-OES") system, an atomic absorption spectrometry ("AAS") system, a microwave plasma atomic emission spectrometry ("MP AES") system, a laser direct infrared imaging ("LDIR") system, an ultraviolet-visible ("UV-Vis") spectrophotometry system, an ultraviolet-visible-near infrared ("UV Vis-NIR") spectrophotometry system, an electron microscopy system, a microarray scanner, a polymerase chain reaction ("PCR") instrument, a sequencing system, a cytometry system, a cell analysis system, a fluorescence and chromogenic in situ hybridization-based ("FISH/ISH") system, a sample staining system, a sample preparation system, a high vacuum system, a microlithography system, a nanolithography system, a chemical vapor deposition ("CVD") system, an ion-beam etching system, a sputtering system, an ion-beam implantation system, or a molecular beam-epitaxy system, and/or the like.

According to some embodiments, the first task might comprise running a sample using laboratory instrumentation, where the pre-processing time might comprise time during which at least one of the following processes occur: instrument conditioning of the first equipment, warming up of the first equipment, transferring the sample from a container to a sample preparation system, preparation of the sample using the sample preparation system, transferring the sample to the first equipment, or configuring the first equipment to perform the first task, and/or the like. Alternatively, or additionally, the first task might comprise running a sample using laboratory instrumentation, where the post-processing time might comprise time during which at least one of the following processes occur: transferring the sample to a container after completing the first task, cleaning the first equipment, or transferring or saving data obtained during the first task, and/or the like.

In some embodiments, determining the pre-processing time involved with performance of the first task using the first equipment might comprise determining, with the computing system, a pre-processing time involved with performance of the first task using the first equipment, based at least in part on at least one of one or more prior pre-processing times for performance of the first task on similar equipment, one or more prior pre-processing times for performance of the first task using the first equipment, one or more prior pre-processing times for performance of the first task by the first user using similar equipment, or one or more prior pre-processing times for performance of the first task by the first user using the first equipment, and/or the like.

Alternatively, or additionally, determining the pre-processing time involved with performance of the first task using the first equipment might comprise using at least one of a moving average algorithm, a linear regression algorithm, a Grubbs outlier test, a Chauvenet's criterion test, a Pierce's criterion test, or a Dixon's Q test on at least one of historical and current data regarding pre-processing times for performance of the first task on similar equipment, historical and current data regarding pre-processing times for performance of the first task using the first equipment, historical and current data regarding pre-processing times for performance of the first task by the first user using similar equipment, or historical and current data regarding pre-processing times for performance of the first task by the first user using the first equipment, and/or the like.

In a similar manner, determining the post-processing time involved with performance of the first task using the first equipment might comprise determining, with the computing system, a post-processing time involved with performance of the first task using the first equipment, based at least in part on at least one of one or more prior post-processing times for performance of the first task on similar equipment, one or more prior post-processing times for performance of the first task using the first equipment, one or more prior post-processing times for performance of the first task by the first user using similar equipment, or one or more prior post-processing times for performance of the first task by the first user using the first equipment, and/or the like.

Alternatively, or additionally, determining the post-processing time involved with performance of the first task using the first equipment comprises using at least one of a moving average algorithm, a linear regression algorithm, a Grubbs outlier test, a Chauvenet's criterion test, a Pierce's criterion test, or a Dixon's Q test on at least one of historical and current data regarding post-processing times for performance of the first task on similar equipment, historical and current data regarding post-processing times for performance of the first task using the first equipment, historical and current data regarding post-processing times for performance of the first task by the first user using similar equipment, or historical and current data regarding post-processing times for performance of the first task by the first user using the first equipment, and/or the like.

According to some embodiments, at least one of determining the core processing time, determining the pre-processing time, or determining the post-processing time might be performed using at least one of an artificial intelligence ("AI") system, a machine learning system, a learning algorithm-based system, or a neural network system to enhance computational processing by the computing system, and/or the like.

In some embodiments, the method might further comprise monitoring, with one or more first sensors, one or more operating conditions of first equipment; receiving, with the computing system and from the one or more first sensors, the monitored one or more operating conditions of first equipment; and determining, with the computing system, whether the monitored one or more operating conditions of first equipment are indicative of potential time delays with the use of the first equipment to perform the first task; wherein at least one of determining the core processing time, determining the pre-processing time, or determining the post-processing time might be based at least in part on a result of the determination as to whether the monitored one or more operating conditions of first equipment are indicative of potential time delays with the use of the first equipment to perform the first task.

According to some embodiments, monitoring the one or more operating conditions of the first equipment might be performed continuous, periodically, or in response to a user command. In some cases, the one or more operating conditions of first equipment might comprise at least one of pre-startup temperature, warm-up temperature, operating temperature, cool-down temperature, presence of error indicators or signals, presence of warning indicators or signals, or one or more sounds during use, and/or the like.

In some embodiments, one or more other users might be scheduled to use the first equipment before the first user. In such embodiments, the method might further comprise identifying, with the computing system, a task to be performed by each of the one or more other users using the first equipment; determining, with the computing system, a core processing time for each of the identified tasks to be performed by each of one or more other users using the first equipment; determining, with the computing system, a pre-processing time involved with performance of the identified tasks for each of the one or more other users using the first equipment; determining, with the computing system, a post-processing time involved with performance of the identified tasks for each of the one or more other users using the first equipment; determining, with the computing system, an estimated total processing time to complete each of the identified tasks to be performed by the one or more other users using the first equipment; determining, with the computing system, an estimated time at which the first equipment will be available for the first user to use to perform the first task; and displaying, with the computing system and to the first user on the display device, the estimated time at which the first equipment will be available for the first user to use to perform the first task.

According to some embodiments, the first equipment might be among a plurality of equipment capable of performing the first task. In such embodiments, the method might further comprise determining, with the computing system, an estimated time at which each of the plurality of equipment will be available for the first user to use to perform the first task, based on determined estimated total processing times to complete identified tasks to be performed by other users using each of the plurality of equipment; determining, with the computing system, the next available equipment among the plurality of equipment based on the determined estimated time at which each of the plurality of equipment will be available for the first user to use to perform the first task; and displaying, with the computing system and to the first user on the display device, the determined available equipment among the plurality of equipment for the first user to use to perform the first task.

In yet another aspect, an apparatus might comprise at least one processor and a non-transitory computer readable medium communicatively coupled to the at least one processor. The non-transitory computer readable medium might have stored thereon computer software comprising a set of instructions that, when executed by the at least one processor, causes the apparatus to: receive, from a first user, a first request to use first equipment that is disposed in a work environment, the first request comprising information regarding a first task to be performed using the first equipment; determine a core processing time during which the requested first equipment performs core processes involved with performing the first task; determine a pre-processing time involved with performance of the first task using the first equipment; determine a post-processing time involved with performance of the first task using the first equipment; determine an estimated total processing time to complete the first task using the first equipment, based on the determined core processing time, the determined pre-processing time, and the determined post-processing time; and display, to the first user on a display device, the estimated total processing time to complete the first task using the first equipment.

In still another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive, from a first user, a first request to use first equipment that is disposed in a work environment, the first request comprising information regarding a first task to be performed using the first equipment; determine a core processing time during which the requested first equipment performs core processes involved with performing the first task; determine a pre-processing time involved with performance of the first task using the first equipment; determine a post-processing time involved with performance of the first task using the first equipment; determine an estimated total processing time to complete the first task using the first equipment, based on the determined core processing time, the determined pre-processing time, and the determined post-processing time; and display, to the first user on a display device, the estimated total processing time to complete the first task using the first equipment.

In another aspect, a method might comprise receiving, with a computing system and from a first user, a first request to use first equipment that is disposed in a work environment, the first request comprising information regarding a first task to be performed using the first equipment; identifying, with the computing system, a task to be performed by each of one or more other users using the first equipment; determining, with the computing system, a core processing time for each of the identified tasks to be performed by each of one or more other users using the first equipment; determining, with the computing system, a pre-processing time involved with performance of the identified tasks for each of the one or more other users using the first equipment; determining, with the computing system, a post-processing time involved with performance of the identified tasks for each of the one or more other users using the first equipment; determining, with the computing system, an estimated total processing time to complete each of the identified tasks to be performed by the one or more other users using the first equipment; determining, with the computing system, an estimated time at which the first equipment will be available for the first user to use to perform the first task; and displaying, with the computing system and to the first user on a display device, the estimated time at which the first equipment will be available for the first user to use to perform the first task.

In yet another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive, from a first user, a first request to use first equipment that is disposed in a work environment, the first request comprising information regarding a first task to be performed using the first equipment; identify a task to be performed by each of one or more other users using the first equipment; determine a core processing time for each of the identified tasks to be performed by each of one or more other users using the first equipment; determine a pre-processing time involved with performance of the identified tasks for each of the one or more other users using the first equipment; determine a post-processing time involved with performance of the identified tasks for each of the one or more other users using the first equipment; determine an estimated total processing time to complete each of the identified tasks to be performed by the one or more other users using the first equipment; determine an estimated time at which the first equipment will be available for the first user to use to perform the first task; and display, to the first user on a display device, the estimated time at which the first equipment will be available for the first user to use to perform the first task.

In still another aspect, a method might comprise receiving, with a computing system and from a first user, a first request to use first equipment that is disposed in a work environment, the first request comprising information regarding a first task to be performed using the first equipment, wherein the first equipment is among a plurality of equipment capable of performing the first task; determining, with the computing system, an estimated time at which each of the plurality of equipment will be available for the first user to use to perform the first task, based on determined estimated total processing times to complete identified tasks to be performed by other users using each of the plurality of equipment; determining, with the computing system, the next available equipment among the plurality of equipment based on the determined estimated time at which each of the plurality of equipment will be available for the first user to use to perform the first task; and displaying, with the computing system and to the first user on a display device, the determined available equipment among the plurality of equipment for the first user to use to perform the first task.

In another aspect, a system might comprise a computing system, which might comprise at least one first processor and a first non-transitory computer readable medium communicatively coupled to the at least one first processor. The first non-transitory computer readable medium might have stored thereon computer software comprising a first set of instructions that, when executed by the at least one first processor, causes the computing system to: receive, from a first user, a first request to use first equipment that is disposed in a work environment, the first request comprising information regarding a first task to be performed using the first equipment, wherein the first equipment is among a plurality of equipment capable of performing the first task; determine an estimated time at which each of the plurality of equipment will be available for the first user to use to perform the first task, based on determined estimated total processing times to complete identified tasks to be performed by other users using each of the plurality of equipment; determine the next available equipment among the plurality of equipment based on the determined estimated time at which each of the plurality of equipment will be available for the first user to use to perform the first task; and display, to the first user on a display device, the determined available equipment among the plurality of equipment for the first user to use to perform the first task.

In yet another aspect, a method might comprise coordinating and scheduling, using a computing system, use of equipment and resources within a work environment. In some embodiments, the method might further comprise controlling, using the computing system, the equipment and the preparation of the resources, based on the coordination and scheduling.

Various modifications and additions can be made to the embodiments discussed without departing from the scope of the invention. For example, while the embodiments described above refer to particular features, the scope of this invention also includes embodiments having different combination of features and embodiments that do not include all of the above described features.

Specific Exemplary Embodiments

We now turn to the embodiments as illustrated by the drawings. FIGS. 1-6 illustrate some of the features of the method, system, and apparatus for implementing task scheduling, and, more particularly, to methods, systems, and apparatuses for implementing optimized scheduling of tasks involving equipment used by multiple individuals, as referred to above. The methods, systems, and apparatuses illustrated by FIGS. 1-6 refer to examples of different embodiments that include various components and steps, which can be considered alternatives or which can be used in conjunction with one another in the various embodiments. The description of the illustrated methods, systems, and apparatuses shown in FIGS. 1-6 is provided for purposes of illustration and should not be considered to limit the scope of the different embodiments.

With reference to the figures, FIG. 1 is a schematic diagram illustrating a system 100 for implementing optimized scheduling of tasks involving equipment used by multiple individuals, in accordance with various embodiments.

In the non-limiting embodiment of FIG. 1, system 100 might comprise a computing system 105a and corresponding database(s) 110a, one or more user devices 115a-115n (collectively, "user devices 115" or the like) associated with or used by one or more users 120a-120n (collectively, "users 120" or the like), one or more equipment 125a-125n (collectively, "equipment 125" or the like), and one or more resources 130, each of which might be disposed in work environment 135. System 100 might further comprise artificial intelligence ("AI") system 140 (optional) might communicatively couple to computing system 105a via network(s) 145. Alternatively, or additionally, system 100 might further comprise remote computing system 105b (optional) and corresponding 110b (optional) might communicatively couple to computing system 105a via network(s) 145. In some embodiments, each of the user devices 115a-115n might comprise at least one of one or more processors 150, a data store 155, one or more cameras 160, a display device 165, a transceiver 170, user interface device 175, one or more audio sensors 180 (optional), or one or more speakers or earpieces 185 (optional), and/or the like. Although a particular combination of components 150-185 is shown in FIG. 1, the various embodiments are not so limited, and some (if not all) of these components 150-185 (whether or not indicated as such in FIG. 1) may be disposed in or may be part of a user device among the plurality of user devices 115, while others of these components 150-185 (whether or not indicated as such in FIG. 1) may be omitted from a user device among the plurality of user devices 115.

According to some embodiments, computing system 105a might include, without limitation, one of a computing system that is integrated with one of the equipment 125, a computing system disposed in the work environment 135, and/or the like. In some instances, remote computing system 105b might include, but is not limited to, a remote computing system disposed external to the work environment 135 and accessible over a network (e.g., network(s) 145, or the like), or a cloud computing system, and/or the like. In some cases, the work environment 135 might include, without limitation, one of a laboratory, a clinic, an office, a construction site, a machine shop, a workshop, a factory, or a room, and/or the like. In some instances, the equipment 125a-125n might each include, but is not limited to, one of laboratory instrumentation, a puzzle, a piece of machinery, an object, a test sample or a tissue sample preparation system, sample identification or tracking system, experimental or laboratory guidance system, histology laboratory equipment, pathology equipment, slide diagnostic system, clinical or analytical laboratory equipment, or reagent or sample transfer system, and/or the like.

In some cases, the laboratory instrumentation, the test sample or a tissue sample preparation system, the sample identification or tracking system, the experimental or laboratory guidance system, the histology laboratory equipment, the pathology equipment, the slide diagnostic system, the clinical or analytical laboratory equipment, or the reagent or sample transfer system might include, without limitation, at least one of an automated clinical chemistry system, a centrifuge, a Raman spectroscopy system, an electrophoresis system, an ion mobility spectrometry ("IMS") system, a mass spectrometry ("MS") system, an inductively coupled plasma mass spectrometry ("ICP-MS") system, a gas chromatography ("GC") system, a gas chromatography mass spectrometry ("GC/MS") system, a liquid chromatography ("LC") system, a high-performance liquid chromatography ("HPLC") system, a liquid chromatography mass spectrometry ("LC/MS") system, an inductively coupled plasma atomic emission spectrometry ("ICP-AES") system, an inductively coupled plasma optical emission spectrometry ("ICP-OES") system, an atomic absorption spectrometry ("AAS") system, a microwave plasma atomic emission spectrometry ("MP-AES") system, a laser direct infrared imaging ("LDIR") system, an ultraviolet-visible ("UV-Vis") spectrophotometry system, an ultraviolet-visible-near infrared ("UV-Vis-NIR") spectrophotometry system, an electron microscopy system, a microarray scanner, a polymerase chain reaction ("PCR") instrument, a sequencing system, a cytometry system, a cell analysis system, a fluorescence and chromogenic in situ hybridization-based ("FISH/ISH") system, a sample staining system, a sample preparation system, a high vacuum system, a microlithography system, a nanolithography system, a chemical vapor deposition ("CVD") system, an ion-beam etching system, a sputtering system, an ion-beam implantation system, or a molecular beam-epitaxy system, and/or the like.

In operation, computing system 105a and/or remote computing system 105b (collectively, "computing system" or the like) might receive, from a first user 120a, a first request to use first equipment 125a that is disposed in work environment 135, the first request comprising information regarding a first task to be performed using the first equipment 125a. The computing system might determine a core processing time during which the requested first equipment 125*a* performs core processes involved with performing the first task. The computing system might determine a pre-processing time involved with performance of the first task using the first equipment 125*a*, in some cases, based at least in part on at least one of one or more prior pre-processing times for performance of the first task on similar equipment, one or more prior pre-processing times for performance of the first task using the first equipment 125*a*, one or more prior pre-processing times for performance of the first task by the first user using similar equipment, or one or more prior pre-processing times for performance of the first task by the first user using the first equipment, and/or the like. The computing system might determine a post-processing time involved with performance of the first task using the first equipment 125*a*, in some cases, based at least in part on at least one of one or more prior post-processing times for performance of the first task on similar equipment, one or more prior post-processing times for performance of the first task using the first equipment 125*a*, one or more prior post-processing times for performance of the first task by the first user using similar equipment, or one or more prior post-processing times for performance of the first task by the first user using the first equipment 125*a*, and/or the like. The computing system might determine an estimated total processing time to complete the first task using the first equipment 125*a*, based on the determined core processing time, the determined pre-processing time, and the determined post-processing time. The computing system might display, to the first user 120*a* on a display device (e.g., display device on user device(s) 115*a*-115*n*, or the like), the estimated total processing time to complete the first task using the first equipment 125*a*.

In some embodiments, the display device might include, but is not limited to, one of a monitor that is communicatively coupled to the first equipment 125*a*, a monitor that is communicatively coupled to the computing system 105*a*, a display device that is disposed in the work environment 135, a display device of a laptop computer (e.g., one of user device(s) 115*a*-115*n*, or the like) that is used by the first user, a display device of a tablet computer (e.g., one of user device(s) 115*a*-115*n*, or the like) that is used by the first user, a display device of a smart phone (e.g., one of user device(s) 115*a*-115*n*, or the like) that is used by the first user, a display device of a mobile phone (e.g., one of user device(s) 115*a*-115*n*, or the like) that is used by the first user, or a display device of an augmented reality ("AR") headset (e.g., one of user device(s) 115*a*-115*n*, or the like) that is worn by the first user, and/or the like.

According to some embodiments, the first task might include, but is not limited to, one of running a test sample or a tissue sample using laboratory instrumentation, solving a puzzle, assembling a piece of machinery, assembling an object, preparing a test sample or a tissue sample, identifying or tracking samples within a laboratory, instructing or guiding users regarding how to perform experimental protocols or tests in a laboratory, performing processes in a histology laboratory, performing processes in a pathologist's office, performing tasks after slide diagnosis, performing processes in a clinical or analytical laboratory, or transferring reagents or samples, and/or the like.

Merely by way of example, in some instances, at least one of determining the core processing time, determining the pre-processing time, or determining the post-processing time may be performed using at least one of an AI system (e.g., AI system 140, or the like), a machine learning system, a learning algorithm-based system, or a neural network system, and/or the like, to enhance computational processing by the computing system.

In some embodiments, one or more first sensors 190 might monitor one or more operating conditions of at least one equipment 125 among equipment 125*a*-125*n*. The computing system might receive, from the one or more first sensors 190, the monitored one or more operating conditions of the at least one equipment 125, and might determine whether the monitored one or more operating conditions of the at least one equipment 125 are indicative of potential time delays with the use of the at least one equipment 125 to perform the first task. At least one of determining the core processing time, determining the pre-processing time, or determining the post-processing time might be based at least in part on a result of the determination as to whether the monitored one or more operating conditions of the at least one equipment 125 are indicative of potential time delays with the use of the at least one equipment 125 to perform the first task. In some cases, monitoring the one or more operating conditions of the first equipment might be performed continuous, periodically, or in response to a user command, and/or the like. In some instances, the one or more operating conditions of first equipment might include, without limitation, at least one of pre-startup temperature, warm-up temperature, operating temperature, cool-down temperature, presence of error indicators or signals, presence of warning indicators or signals, or one or more sounds during use, and/or the like.

According to some embodiments, one or more other users 120*b*-120*n* might be scheduled to use the at least one equipment 125 before the first user 120*a*. In such embodiments, the computing system might identify a task to be performed by each of the one or more other users 120*b*-120*n* using the at least one equipment 125; might determine a core processing time for each of the identified tasks to be performed by each of one or more other users 120*b*-120*n* using the at least one equipment 125; might determine a pre-processing time involved with performance of the identified tasks for each of the one or more other users 120*b*-120*n* using the at least one equipment 125; might determine a post-processing time involved with performance of the identified tasks for each of the one or more other users 120*b*-120*n* using the at least one equipment 125; might determine an estimated total processing time to complete each of the identified tasks to be performed by the one or more other users 120*b*-120*n* using the at least one equipment 125; might determine an estimated time at which the at least one equipment 125 will be available for the first user 120*a* to use to perform the first task; and might display, to the first user 120*a* on the display device, the estimated time at which the at least one equipment 125 will be available for the first user 120*a* to use to perform the first task.

In some embodiments, the computing system might determine an estimated time at which each of the plurality of equipment 125*a*-125*n* will be available for the first user 120*a* to use to perform the first task, based on determined estimated total processing times to complete identified tasks to be performed by other users 120*b*-120*n* using each of the plurality of equipment 125*a*-125*n*. The computing system might determine the next available equipment 125 among the plurality of equipment 125*a*-125*n* based on the determined estimated time at which each of the plurality of equipment 125*a*-125*n* will be available for the first user 120*a* to use to perform the first task. The computing system might display, to the first user 120*a* on the display device, the determined available equipment 125 among the plurality of equipment 125a-125n for the first user 120a to use to perform the first task.

According to some embodiments, the estimated total processing times might include, but is not limited to, time contributors that are unknown (in some cases, including pre-processing time, core processing time, and post-processing time, or the like). In some instances, these unknown time contributors might be significant in terms of contribution to the total processing time, but do not show relevant variation. All known time contributors might include, without limitation, known processing times for particular known model-like instrument types (e.g., GC, HPLC, etc.), known processing times for particular known techniques for laboratory or sample measurement. For each combination of parameter values that are measured, the total analysis time or total processing time might include, but is not limited to, pre-processing time, core processing time, and post-processing time. For example, for a GC-Headspace instrument analyzing volatile organic compounds ("VOCs") at a lab temperature of between 25 and 30° C., the total processing time might be 12.3 minutes. Significantly, for a GC-Headspace instrument analyzing VOCs at a lab temperature of between 20 and 25° C., the total processing time might be 11.6 minutes. Similarly, for a GC-Headspace instrument analyzing Dichloromethane at a lab temperature of between 25 and 30° C., the total processing time might be 8.4 minutes. Significantly, for a GC-Headspace instrument analyzing Dichloromethane at a lab temperature of between 20 and 25° C., the total processing time might be 7.9 minutes. These measured processing times and parameters may be stored in a parameter table, or the like, that may be stored in, e.g., database(s) 110a and/or 110b, or the like.

In some embodiments, the measured total processing time may be updated with each measurement of that nature. Statistical techniques (including, but not limited to, moving average, Grubbs outlier test, etc.) could be applied by, e.g., storing the last n measured total analysis times and deriving the prediction for the next sample run of that nature. In practical use cases, there might be ten or more parameters required for classification. For the very first sample analysis, where a total analysis time has not yet been measured, a similarity approach (e.g., using artificial intelligence, or the like) can be applied. Each parameter might be assigned a weighting factor associated by an expert judgment or by a neural network calculation. In some instances, the predicted total processing time for such sample might be derived from the best match of the stored parameter table. For a GC-Headspace instrument analyzing Dichloromethane at a lab temperature of 31° C., the best match based on the above-mentioned parameter table might be 8.4 minutes (i.e., for a GC-Headspace instrument analyzing Dichloromethane at a lab temperature of between 25 and 30° C.). For the actual measured total analysis time under these conditions, the new entry table might be as follows, for a GC-Headspace instrument analyzing Dichloromethane: (i) at a lab temperature of between 21 and 25° C., the total processing time might be 7.9 minutes; (ii) at a lab temperature of between 26 and 30° C., the total processing time might be 8.4 minutes; and (iii) at a lab temperature of between 31 and 35° C., the total processing time might be 8.6 minutes.

In a non-limiting example, for a gas chromatography measurement, a heating probe(s) in an oven may measure temperature from start temperature to end temperature. At the end of the measurement, the oven needs to cool down before the next measurement can be started. The time to adjust the correct oven temperature is conventionally not considered. In particular, conventional systems generally do not consider sample preparation (e.g., heating of a sample at a gas chromatography headspace sampler, or the like) at state runtime in a chromatography data system ("CDS"). In various embodiments, an adaptive algorithm may be used to estimate the total analysis runtime (including the sample preparation time, or the like) by measurement of the analysis runtime and to store the real runtime with the corresponding analysis parameter set in a database. The various embodiments might match analysis parameter sets with the entries stored in a database. Based on the analysis parameter sets matching corresponding parameter sets stored in the database, the various embodiments might provide estimated runtime, which might correspond to, might equal, or might be based on the calculated runtime by the adaptive algorithm. On the other hand, based on the analysis parameter sets not matching any parameter sets stored in the database, the various embodiments might create a new entry in the database, where the new entry might include a default runtime that might correspond to, might equal, or might be based on a value submitted from the CDS for each of the injections per sample. In some embodiments, a learning approach or machine learning, or the like, might be used to improve with every analysis.

Merely by way of example, in some cases, for each analysis, at least some of the following set of parameters may be stored: injections per sample, sample preparation method name, processing method name, acquisition method name, injection source, injection volume, setting "use method injection volume," instrument name, vial position, runtime as calculated by the CDS, predicted measurement time, and/or actually measured runtime, and/or the like. In some cases, analysis values may be compared for similar analyses and/or for similar equipment, and if the analysis values match, the actually measured runtime may be used as runtime prediction for subsequent similar analyses and/or for similar equipment. In some embodiments, instead of using the last measured runtime, an average of the last several analyses (such as a moving window or the like) may be used. If there is no parameter set in the database with exactly the same values yet, based on weighing each parameter, a similarity values can be calculated. As shown in FIG. 2C, some parameters have a weighting factor or priority value. In the case that the similarity value is more than a given threshold, the runtime prediction can be derived form that parameter set.

For each parameter set, statistical methods (e.g., variance) can be used to determine the robustness of the runtime prediction. If the variance is too big, this indicates that the system contains an influencing parameter that has not been taken into account. In some cases, an expert might need to identify such a parameter. Alternatively, or additionally, the various embodiments might utilize a computing system, an AI, or other system to identify such a parameter. In some instances, a neural network may be used to adjust the weighting factors or values of the parameters.

In some embodiments, the computing system or the sample scheduler might determine pre-processing, core processing, post-processing, and total processing times of various tasks, based at least in part on, among others, the type of task, the time of week (e.g., with shut down over the weekend potentially resulting in slower pre-processing or warm-up times on Mondays, etc.), the instrument type, the analysis type, the sample type, the user, and/or the like.

According to some embodiments, the computing system or sample scheduler may be used in conjunction with a fully or partially automated laboratory. For example, a laboratory might include, without limitation, at least one of one or more automated sample preparation systems, one or more automated instruments for analyzing samples prepared by the one or more automated sample preparation systems, or one or more sample transfer systems, and/or the like. The computing system or sample scheduler might determine runtimes for each of the one or more automated instruments (including, but is not limited to, pre-processing times, core processing times, post-processing times, or total processing times, or the like), might determine warm-up times, sample preparation times, and clean-up times for each of the one or more automated sample preparation systems, and might determine operation times, transfer times that the one or more sample transfer systems take to transfer samples from the automated sample preparation systems to the automated instruments and from the automated instruments to a sample storage or sample disposal system. Based on such determination, the computing system or sample scheduler might control the operations of the at least one of the one or more automated sample preparation systems, the one or more automated instruments for analyzing samples prepared by the one or more automated sample preparation systems, or the one or more sample transfer systems, and/or the like.

For instance, in a laboratory with 10 automated instruments, 2 automated sample preparation systems, and 2 automated sample transfer systems, the computing system or sample scheduler might determine the appropriate warm-up times, runtimes, transfer times, operation times, and/or the like, for all these instruments and systems, and might identify the optimal coordination and schedule for operating the 10 automated instruments, 2 automated sample preparation systems, and 2 automated sample transfer systems, to account for warm-up times for each instrument or system, the time samples are prepared, the time it takes to transfer the samples from one location to another, the available use times for each instrument, and/or the like. In this manner, optimized coordination and scheduling of use of equipment and resources within the laboratory may be achieved.

These and other functions of the system 100 (and its components) are described in greater detail below with respect to FIGS. 2-4.

Figure 2A:
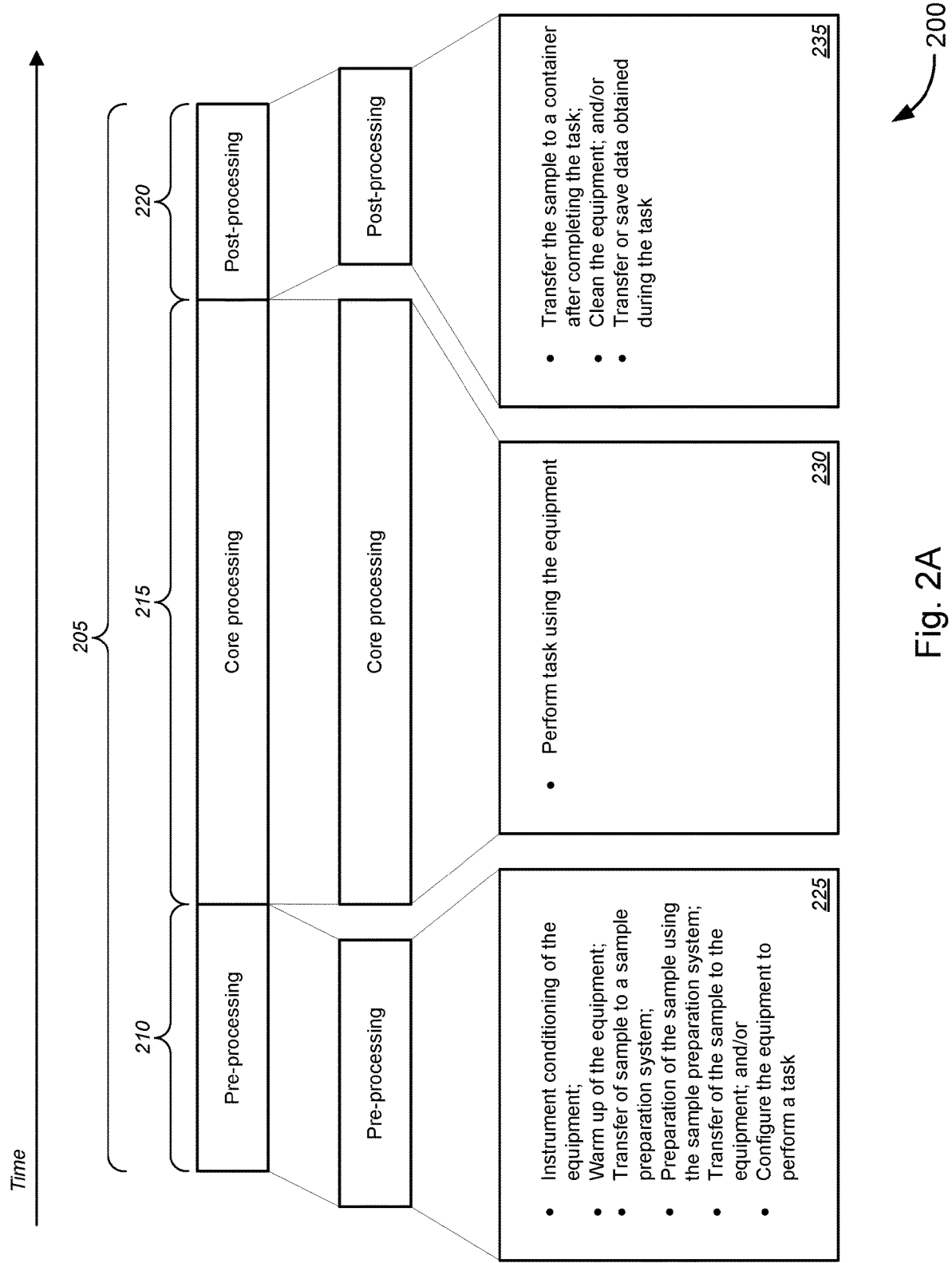
FIG. 2A is a schematic diagram illustrating a non-limiting example of components of processing time during use of equipment that may be taken into account when implementing optimized scheduling of tasks involving equipment used by multiple individuals, in accordance with various embodiments.
Figure 2B:
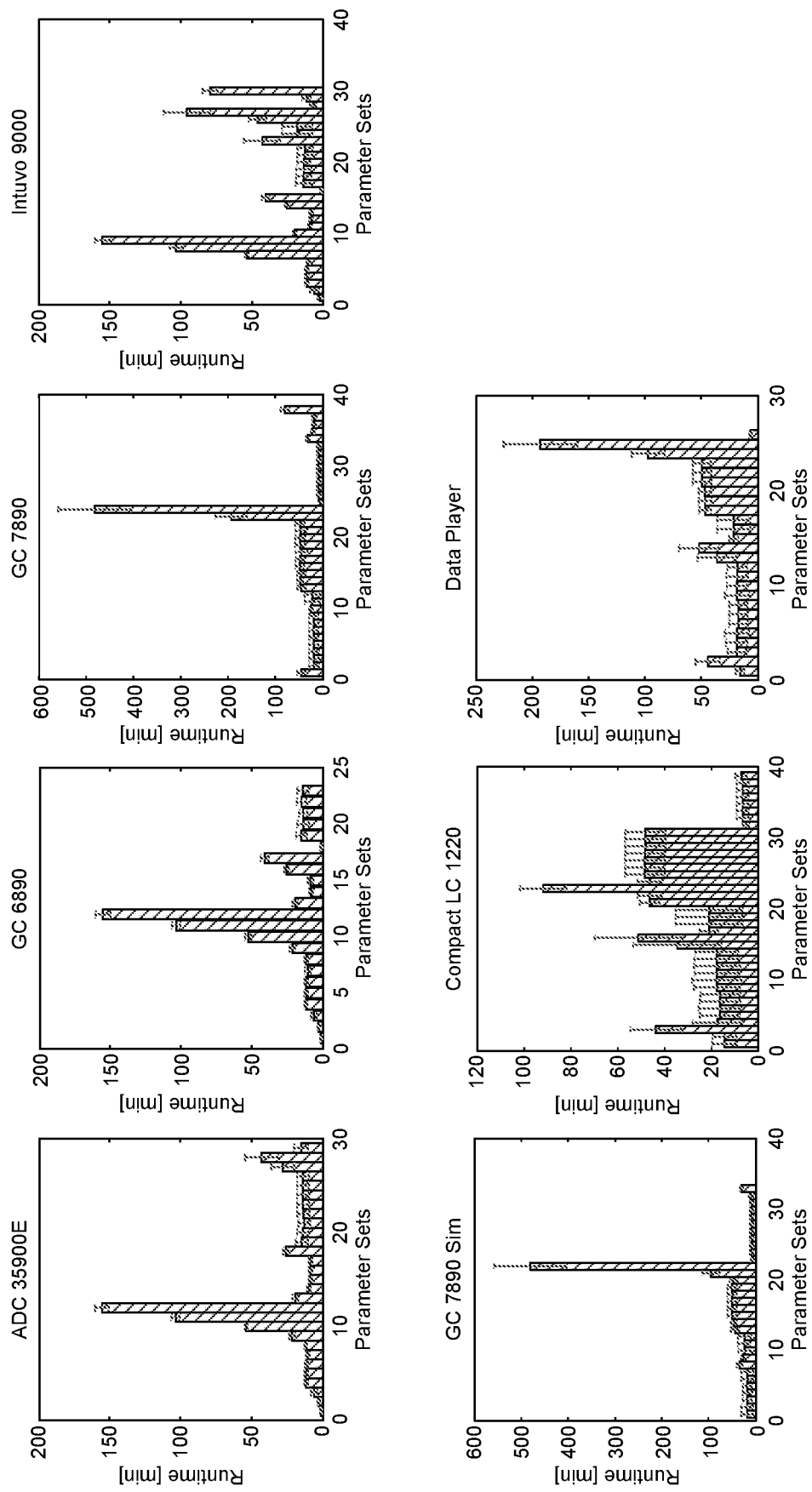
FIG. 2B is a compilation of graphical diagrams illustrating various non-limiting examples of conventional processing time predictions (depicted by the shaded bars in the bar graphs) versus actual measurement times (depicted by the error bars for each bar graph) associated with use of various different equipment.
Figure 2C:
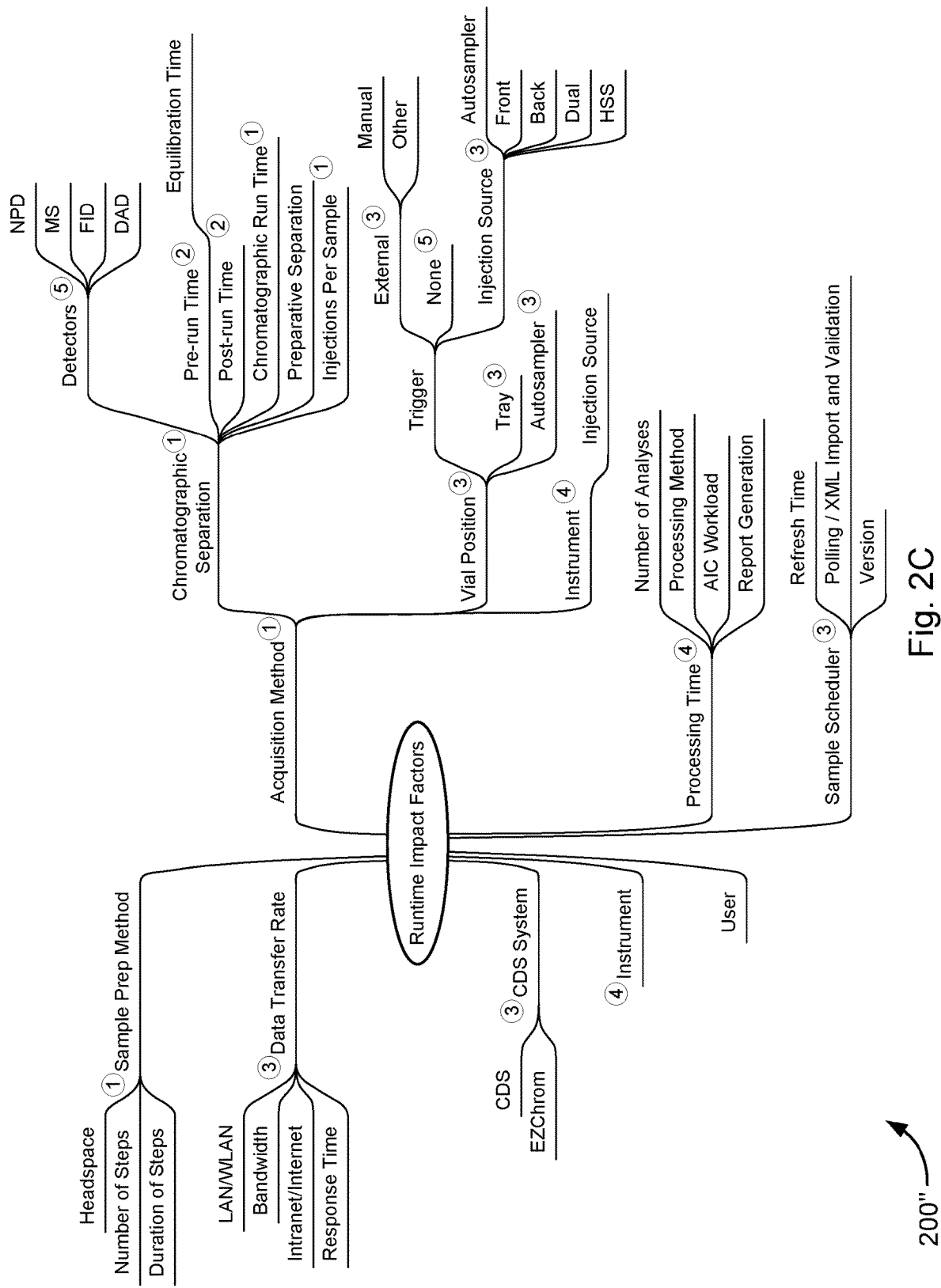
FIG. 2C is a schematic diagram illustrating various non-limiting factors for one non-limiting example of use of equipment that may be taken into account when implementing optimized scheduling of tasks involving equipment used by multiple individuals, in accordance with various embodiments.

FIGS. 2A-2C (collectively, "FIG. 2") illustrate that equipment use is not limited to core processing time of that equipment, but rather also includes pre-processing times and post-processing times, which may be due to a variety of factors, that must be taken into account to more precisely calculating equipment use times. FIG. 2A is a schematic diagram illustrating a non-limiting example 200 of components of processing time during use of equipment that may be taken into account when implementing optimized scheduling of tasks involving equipment used by multiple individuals, in accordance with various embodiments. FIG. 2B is a compilation of graphical diagrams illustrating various non-limiting examples 200' of conventional processing time predictions (depicted by the shaded bars in the bar graphs) versus actual measurement times (depicted by the error bars for each bar graph) associated with use of various different equipment. FIG. 2C is a schematic diagram illustrating various non-limiting factors for one non-limiting example 200" of use of equipment that may be taken into account when implementing optimized scheduling of tasks involving equipment used by multiple individuals, in accordance with various embodiments.

With reference to the non-limiting example 200 of FIG. 2A, processing time or total processing time 205 involved with performing a first task is shown relative to a time axis. The processing time 205 might include, without limitation, pre-processing time 210, core processing time 215, and post-processing time 220. Determining the pre-processing time 210 might be based at least in part on at least one of one or more prior pre-processing times for performance of the first task on similar equipment, one or more prior pre-processing times for performance of the first task using the first equipment, one or more prior pre-processing times for performance of the first task by the first user using similar equipment, or one or more prior pre-processing times for performance of the first task by the first user using the first equipment, and/or the like. Determining the core processing time 215 might be based at least in part on at least one of one or more prior core processing times for performance of the first task on similar equipment, one or more prior core processing times for performance of the first task using the first equipment, one or more prior core processing times for performance of the first task by the first user using similar equipment, or one or more prior core processing times for performance of the first task by the first user using the first equipment, and/or the like. Determining the post-processing time 220 might be based at least in part on at least one of one or more prior post-processing times for performance of the first task on similar equipment, one or more prior post-processing times for performance of the first task using the first equipment, one or more prior post-processing times for performance of the first task by the first user using similar equipment, or one or more prior post-processing times for performance of the first task by the first user using the first equipment, and/or the like.

According to some embodiments, the pre-processing time 210 might include time attributed to pre-processing tasks 225, including, but is not limited to, at least one of instrument conditioning of the equipment, warm-up of the equipment, transfer of a sample to a sample preparation system, preparation of the sample using the sample preparation system, transfer of the sample to the equipment, or configuration of the equipment to perform the first task, and/or the like. In some embodiments, the core-processing time 215 might include time attributed to performance of the first task using the equipment 230. In some cases, the first task might include, without limitation, one of running a test sample or a tissue sample using laboratory instrumentation, solving a puzzle, assembling a piece of machinery, assembling an object, preparing a test sample or a tissue sample, identifying or tracking samples within a laboratory, instructing or guiding users regarding how to perform experimental protocols or tests in a laboratory, performing processes in a histology laboratory, performing processes in a pathologist's office, performing tasks after slide diagnosis, performing processes in a clinical or analytical laboratory, or transferring reagents or samples, and/or the like. According to some embodiments, the post-processing time 220 might include time attributed to post-processing tasks 235, including, but is not limited to, at least one of transfer of the sample to a container after completing the first task, cleaning of the equipment, or transfer or saving of the data obtained during the first task, and/or the like.

Referring to the non-limiting examples 200' of FIG. 2B, conventional prediction times (depicted by shaded bars in each graph) compared with actual measurement times (depicted by error bars in each graph) for processing using various different instruments (including, but not limited to, ADC 35900E, GC 6890, GC 7890, Intuvo 9000, GC 7890 Sim, Compact LC 1220, Data Player, and/or other instrument models, or the like). In each graph, runtime (in minutes) is graphed versus parameter sets, which might include, without limitation, at least one of injections per sample, sample preparation methods, processing methods, acquisition methods, injection sources, injection volumes, setting injection volume, type of instruments, vial positions, runtimes as calculated by an instrument data system (e.g., a chromatography data system, or the like), predicted measurement times, or actually measured runtimes, and/or the like.

Turning to the non-limiting example 200 of FIG. 2C, various runtime impact factors or parameters are shown. The runtime impact factors or parameters might include, but are not limited to, at least one of sample preparation method, data transfer rate, chromatography data system ("CDS"), instrument, user, acquisition method, processing time, or sample scheduler, and/or the like. In some cases, the sample preparation method might include associated runtime impact factors or parameters, including, without limitation, headspace, number of steps, or duration of steps, and/or the like. In some instances, the data transfer rate might include associated runtime impact factors or parameters, including, without limitation, local area network ("LAN") or wireless LAN ("WLAN"), bandwidth, intranet or Internet, response time, and/or the like. In some cases, the CDS might include associated runtime impact factors or parameters, including, without limitation, CDS or EZChrom, or the like.

In some embodiments, the acquisition method might include associated runtime impact factors or parameters, including, without limitation, chromatographic separation, vial position, instrument, and/or the like. In some cases, the chromatographic separation might include associated runtime impact factors or parameters, including, without limitation, detectors (including, but not limited to, nitrogen phosphorus detector ("NPD"), mass spectrometer ("MS"), flame ionization detector ("FID"), diode array detector ("DAD"), etc.), pre-run time (including, but not limited to, equilibration time, etc.), post-run time, chromatographic run time, preparative separation, or injections per sample, and/or the like. In some instances, the vial position might include associated runtime impact factors or parameters, including, without limitation, trigger (including, but not limited to, external (either manual or other)), none, or injection source (including, but not limited to, autosampler, front, back, dual, HSS, etc.), tray, or autosampler, and/or the like. In some cases, the instrument might include associated runtime impact factors or parameters, including, without limitation, injection source or the like. According to some embodiments, the processing time might include associated runtime impact factors or parameters, including, without limitation, number of analyses, processing method, AIC workload, or report generation, and/or the like. In some instances, the sample scheduler might include associated runtime impact factors or parameters, including, without limitation, refresh time, polling or eXtensible Markup Language ("XML") import and validation, or version, and/or the like.

Merely by way of example, in some cases, priority might be given to some of the runtime impact factors or parameters over others of the runtime impact factors or parameters. In some instances, different weightings might be given to particular runtime impact factors or parameters, based on the priority given to each of the particular runtime impact factors or parameters. Specifically, with respect to the non-limiting example 200" of FIG. 2C, the runtime impact factors or parameters denoted by the number "1"—including, but not limited to, sample preparation method, acquisition method, chromatographic separation, chromatographic run time, injections per sample, and/or the like)—might be given the highest priority with the greatest weightings. The runtime impact factors or parameters denoted by the number "2"—including, but not limited to, pre-run time, post-run time, and/or the like)—might be given the next highest priority with the next greatest weightings. The runtime impact factors or parameters denoted by the number "3"—including, but not limited to, data transfer rate, CDS system, sample scheduler, vial position, tray, autosampler, external trigger, injection source, and/or the like)—might be given an average priority with average weightings. The runtime impact factors or parameters denoted by the number "4"—including, but not limited to, instrument, acquisition method—instrument, processing time, and/or the like)—might be given a lower priority with lower weightings. The runtime impact factors or parameters denoted by the number "5"—including, but not limited to, detectors, no trigger, and/or the like)—might be given even lower priority with even lower weightings. In some cases, the other runtime impact factors or parameters that are not denoted by any numbers in FIG. 2C either might have no priority or might have the least priority.

Although particular factors or parameters are shown in the example 200" of FIG. 2C, the various embodiments are not so limited, and any other suitable factors or parameters may be taken into account. Also, although particular associations or relationships between or among factors or parameters are shown in the example 200" of FIG. 2C, the various embodiments are not so limited, and any other suitable associations or relationships between or among factors or parameters may be used.

Figure 3B:
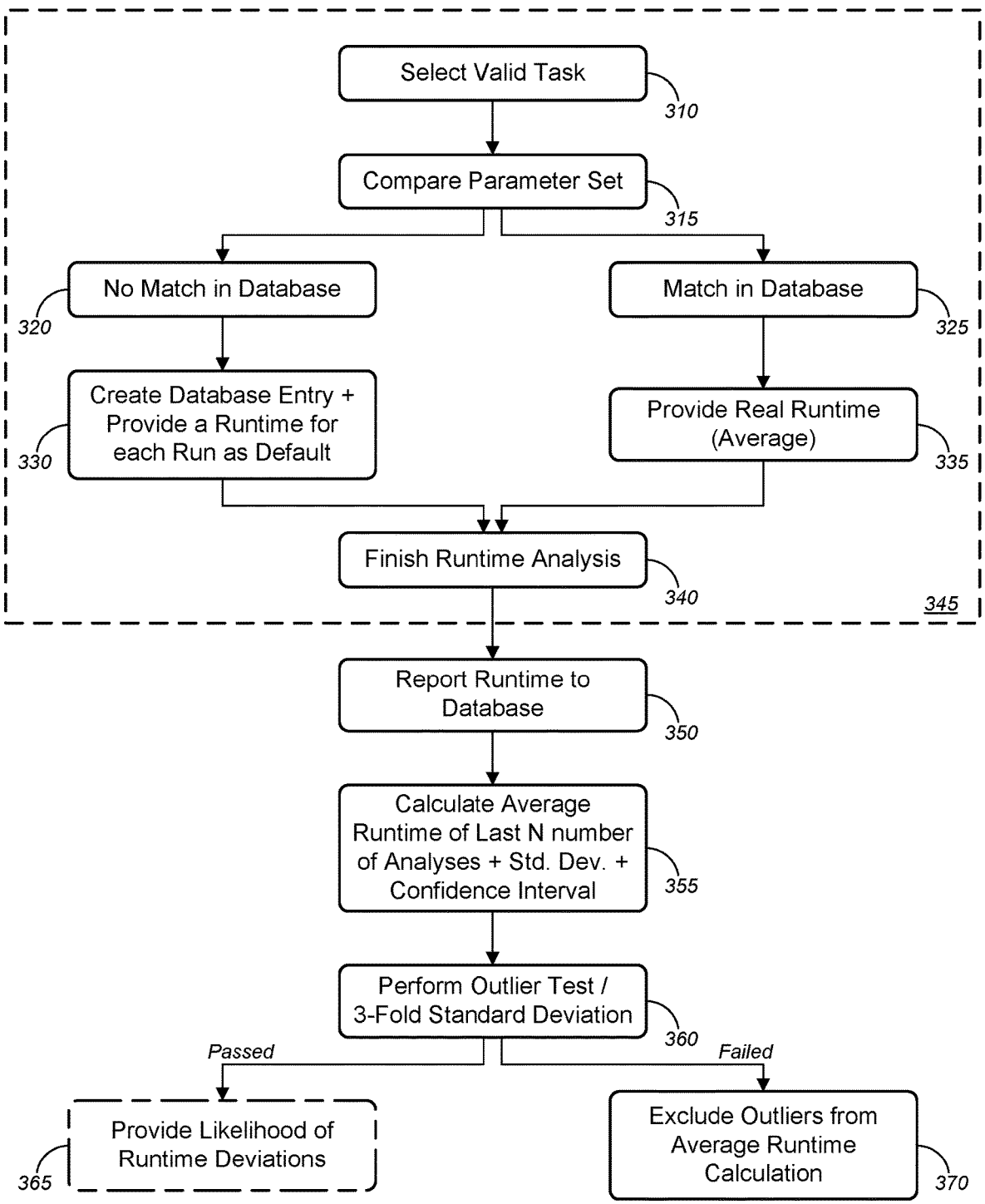
FIG. 3B is a flow diagram illustrating a non-limiting example of a workflow for estimating run time of tasks, in accordance with various embodiments.

FIG. 3A is a schematic diagram illustrating a non-limiting example 300 of a software interface, a web interface, a pop-up window, or other user interface (collectively, "user interface" or the like) that may be used for displaying estimated processing times and availability of equipment as a result of implementing optimized scheduling of tasks involving equipment used by multiple individuals, in accordance with various embodiments. FIG. 3B is a flow diagram illustrating a non-limiting example 300' of a workflow for estimating run time of tasks, in accordance with various embodiments.

As shown in the non-limiting example 300 of FIG. 3A, a sample scheduler user interface 305 might include, without limitation, at least one of a list of instruments (e.g., instrument 1 and instrument 2, as shown in FIG. 3A, or the like), a list of users (e.g., users 1 through 10, as shown in FIG. 3A, or the like; although "User 1," User 2," and so on is shown, the various embodiments are not so limited and the actual names or user names of the users may be used instead), a list of identifiers (which might be based on the users, the actual names of users, the user names of users, the date, the time, and/or the like), a list of sample names (e.g., samples 1 through 8, as shown in FIG. 3A, or the like; although "Sample 1," "Sample 2," and so on is shown, the various embodiments are not so limited and the actual sample names, code names of samples, or generic names of samples, etc., may be used instead), a list of acquisition methods (e.g., methods 1 through 4, as shown in FIG. 3A, or the like; although "Method 1," "Method 2," and so on is shown, the various embodiments are not so limited and the actual method names, code names of the methods, or generic names of the methods, etc., may be used instead), a list of statuses of the acquisition (e.g., "in progress," "in queue," or the like), a list of estimated pre-processing times (in minutes), a list of estimated core processing times (in minutes), a list of estimated post-processing times (in minutes), or a list of estimated total processing times (in minutes), and/or the like.

In some embodiments, Instrument 1 or Instrument 2 might be one of laboratory instrumentation, including, but not limited to, at least one of an automated clinical chemistry system, a centrifuge, a Raman spectroscopy system, an electrophoresis system, an ion mobility spectrometry ("IMS") system, a mass spectrometry ("MS") system, an inductively coupled plasma mass spectrometry ("ICP-MS") system, a gas chromatography ("GC") system, a gas chromatography mass spectrometry ("GC/MS") system, a liquid chromatography ("LC") system, a high-performance liquid chromatography ("HPLC") system, a liquid chromatography mass spectrometry ("LC/MS") system, an inductively coupled plasma atomic emission spectrometry ("ICP-AES") system, an inductively coupled plasma optical emission spectrometry ("ICP-OES") system, an atomic absorption spectrometry ("AAS") system, a microwave plasma atomic emission spectrometry ("MP AES") system, a laser direct infrared imaging ("LDIR") system, an ultraviolet-visible ("UV-Vis") spectrophotometry system, an ultraviolet-visible-near infrared ("UV Vis-NIR") spectrophotometry system, an electron microscopy system, a microarray scanner, a polymerase chain reaction ("PCR") instrument, a sequencing system, a cytometry system, a cell analysis system, a fluorescence and chromogenic in situ hybridization-based ("FISH/ISH") system, a sample staining system, a sample preparation system, a high vacuum system, a microlithography system, a nanolithography system, a chemical vapor deposition ("CVD") system, an ion-beam etching system, a sputtering system, an ion-beam implantation system, or a molecular beam-epitaxy system, and/or the like.

For example, as shown in FIG. 3A, with respect to Instrument 1, User 1 might have signed up, or requested, to use Instrument 1 to test Sample 1 using Method 1. In response to the request, the sample scheduler might generate identifier "user01_2019-04-12_0750," might determine and display estimated pre-processing, core processing, post-processing, and total processing times of 20, 59, 10, and 89 minutes, respectively, and might indicate a status (in this case, "In progress"). Similarly, User 2 might have signed up, or requested, to use Instrument 1 to test Sample 1 using Method 2. In response to the request, the sample scheduler might generate identifier "user02_2019-04-12_0821," might determine and display estimated pre-processing, core processing, post-processing, and total processing times of 17, 52, 10, and 79 minutes, respectively, and might indicate a status (in this case, "In queue"). Likewise, User 3 might have signed up, or requested, to use Instrument 1 to test Sample 1 using Method 3. In response to the request, the sample scheduler might generate identifier "user02_2019-04-12_1012," might determine and display estimated pre-processing, core processing, post-processing, and total processing times of 15, 73, 9, and 97 minutes, respectively, and might indicate a status (in this case, "In queue"). Similarly, User 4 might have signed up, or requested, to use Instrument 1 to test Sample 2 using Method 1. In response to the request, the sample scheduler might generate identifier "user02_2019-04-12_1035," might determine and display estimated pre-processing, core processing, post-processing, and total processing times of 16, 59, 8, and 83 minutes, respectively, and might indicate a status (in this case, "In queue"). Likewise, User 5 might have signed up, or requested, to use Instrument 1 to test Sample 3 using Method 2. In response to the request, the sample scheduler might generate identifier "user02_2019-04-12_1104," might determine and display estimated pre-processing, core processing, post-processing, and total processing times of 15, 52, 9, and 76 minutes, respectively, and might indicate a status (in this case, "In queue"). Similarly, User 6 might have signed up, or requested, to use Instrument 1 to test Sample 3 using Method 1. In response to the request, the sample scheduler might generate identifier "user02_2019-04-12_1250," might determine and display estimated pre-processing, core processing, post-processing, and total processing times of 17, 59, 10, and 86 minutes, respectively, and might indicate a status (in this case, "In queue").

In some cases, the sample scheduler might determine and display average estimated pre-processing, core processing, post-processing, and total processing times of 16.67, 59.00, 9.33, and 85.00 minutes, respectively, might determine and display a total current overall time for instrument 1 of 8 hours and 31 minutes, and might determine and display the next available time (in this case, "at about 4:44 p.m." or the like).

With respect to Instrument 2, User 7 might have signed up, or requested, to use Instrument 2 to test Sample 4 using Method 4. In response to the request, the sample scheduler might generate identifier "user07_2019-04-12_0813," might determine and display estimated pre-processing, core processing, post-processing, and total processing times of 20, 82, 7, and 109 minutes, respectively, and might indicate a status (in this case, "In progress"). Similarly, User 8 might have signed up, or requested, to use Instrument 2 to test Sample 5 using Method 2. In response to the request, the sample scheduler might generate identifier "user08_2019-04-12_0925," might determine and display estimated pre-processing, core processing, post-processing, and total processing times of 15, 52, 10, and 77 minutes, respectively, and might indicate a status (in this case, "In queue"). Likewise, User 8 might have signed up, or requested, to use Instrument 2 to test Sample 6 using Method 1. In response to the request, the sample scheduler might generate identifier "user08_2019-04-12_1053," might determine and display estimated pre-processing, core processing, post-processing, and total processing times of 16, 59, 9, and 84 minutes, respectively, and might indicate a status (in this case, "In queue"). Similarly, User 9 might have signed up, or requested, to use Instrument 2 to test Sample 7 using Method 3. In response to the request, the sample scheduler might generate identifier "user09_2019-04-12_1127," might determine and display estimated pre-processing, core processing, post-processing, and total processing times of 13, 73, 8, and 94 minutes, respectively, and might indicate a status (in this case, "In queue"). Likewise, User 10 might have signed up, or requested, to use Instrument 2 to test Sample 8 using Method 1. In response to the request, the sample scheduler might generate identifier "user02_2019-04-12_1251," might determine and display estimated pre-processing, core processing, post-processing, and total processing times of 16, 59, 11, and 86 minutes, respectively, and might indicate a status (in this case, "In queue").

In some instances, the sample scheduler might determine and display average estimated pre-processing, core processing, post-processing, and total processing times of 16.00, 65.00, 9.00, and 90.00 minutes, respectively, might determine and display a total current overall time for instrument 2 of 7 hours and 30 minutes, and might determine and display the next available time (in this case, "at about 3:43 p.m." or the like). According to some embodiments, the sample scheduler might determine and display the next available instrument for use by the next user requesting use of equipment (in this case, "Instrument 2") as well as the next available use of that equipment (in this case, "Available at about 3:43 p.m.").

Although FIG. 3A depict the sample scheduler user interface 305 displays only two instruments, the various embodiments are not so limited, and the sample scheduler user interface 305 may display any suitable number of instruments (e.g., 50 instruments, 100 instruments, etc.), and their respective estimated pre-processing, core processing, post-processing, and total processing times.

Turning to FIG. 3B, a non-limiting example 300' of a workflow for estimating run time of a task is shown. According to some embodiments, the task might include, but is not limited to, one of running a test sample or a tissue sample using laboratory instrumentation, solving a puzzle, assembling a piece of machinery, assembling an object, preparing a test sample or a tissue sample, identifying or tracking samples within a laboratory, instructing or guiding users regarding how to perform experimental protocols or tests in a laboratory, performing processes in a histology laboratory, performing processes in a pathologist's office, performing tasks after slide diagnosis, performing processes in a clinical or analytical laboratory, or transferring reagents or samples, and/or the like.

In some embodiments, the laboratory instrumentation, the test sample or a tissue sample preparation system, the sample identification or tracking system, the experimental or laboratory guidance system, the histology laboratory equipment, the pathology equipment, the slide diagnostic system, the clinical or analytical laboratory equipment, or the reagent or sample transfer system might include, without limitation, at least one of an automated clinical chemistry system, a centrifuge, a Raman spectroscopy system, an electrophoresis system, an ion mobility spectrometry ("IMS") system, a mass spectrometry ("MS") system, an inductively coupled plasma mass spectrometry ("ICP-MS") system, a gas chromatography ("GC") system, a gas chromatography mass spectrometry ("GC/MS") system, a liquid chromatography ("LC") system, a high-performance liquid chromatography ("HPLC") system, a liquid chromatography mass spectrometry ("LC/MS") system, an inductively coupled plasma atomic emission spectrometry ("ICP-AES") system, an inductively coupled plasma optical emission spectrometry ("ICP-OES") system, an atomic absorption spectrometry ("AAS") system, a microwave plasma atomic emission spectrometry ("MP-AES") system, a laser direct infrared imaging ("LDIR") system, an ultraviolet-visible ("UV-Vis") spectrophotometry system, an ultraviolet-visible-near infrared ("UV-Vis-NIR") spectrophotometry system, an electron microscopy system, a microarray scanner, a polymerase chain reaction ("PCR") instrument, a sequencing system, a cytometry system, a cell analysis system, a fluorescence and chromogenic in situ hybridization-based ("FISH/ISH") system, a sample staining system, a sample preparation system, a high vacuum system, a microlithography system, a nanolithography system, a chemical vapor deposition ("CVD") system, an ion-beam etching system, a sputtering system, an ion-beam implantation system, or a molecular beam-epitaxy system, and/or the like.

With reference to FIG. 3B, workflow 300' might comprise a user selecting a valid task (block 310). At block 315, workflow 300' might comprise comparing a set of parameters or runtime impact factors, including, but not limited to, at least one of sample preparation method (including headspace, number of steps, or duration of steps, and/or the like), data transfer rate (including local area network ("LAN") or wireless LAN ("WLAN"), bandwidth, intranet or Internet, response time, and/or the like), chromatography data system ("CDS") (including CDS or EZChrom, or the like), instrument, user, acquisition method, processing time (including number of analyses, processing method, AIC workload, or report generation, and/or the like), or sample scheduler (including refresh time, polling or eXtensible Markup Language ("XML") import and validation, or version, and/or the like), and/or the like.

In some embodiments, the acquisition method might include associated runtime impact factors or parameters, including, without limitation, chromatographic separation, vial position, instrument, and/or the like. In some cases, the chromatographic separation might include associated runtime impact factors or parameters, including, without limitation, detectors (including, but not limited to, nitrogen phosphorus detector ("NPD"), mass spectrometer ("MS"), flame ionization detector ("FID"), diode array detector ("DAD"), etc.), pre-run time (including, but not limited to, equilibration time, etc.), post-run time, chromatographic run time, preparative separation, or injections per sample, and/or the like. In some instances, the vial position might include associated runtime impact factors or parameters, including, without limitation, trigger (including, but not limited to, external (either manual or other)), none, or injection source (including, but not limited to, autosampler, front, back, dual, HSS, etc.), tray, or autosampler, and/or the like. In some cases, the instrument might include associated runtime impact factors or parameters, including, without limitation, injection source or the like.

In response to comparing the parameter sets, workflow 300' might result in a determination of no match in a database (block 320) or a determination of a match in the database (block 325). Based on a determination of no match in the database (at block 320), workflow 300' might comprise creating a database entry and providing a runtime for each run as a default (block 330). On the other hand, based on a determination of a match in the database (at block 325), workflow 300' might comprise providing real runtime (e.g., average runtime or the like) (block 335). Workflow 300' might further comprise finishing runtime analysis (block 340). In some instances, the processes at blocks 310-340 might be part of runtime estimation 345.

According to some embodiments, at block 350, workflow 300' might comprise reporting the runtime to the database. Workflow 300' might further comprise, at block 355, calculating average runtime of the last N number of analyses (e.g., the last 100 analyses, the last 200 analyses, the last 250 analyses, the last 300 analyses, the last 400 analyses, the last 500 analyses, etc.), calculating the standard deviation, and calculation the confidence interval, and/or the like. At block 360, workflow 300' might comprise performing an outlier test and/or 3-fold standard deviation. If the test passes, workflow 300' might comprise providing likelihood of runtime deviations (optional block 365). If the test fails, workflow 300' might comprise excluding outliers from average runtime calculation (block 370).

FIGS. 4A-4F (collectively, "FIG. 4") are flow diagrams illustrating a method 400 for implementing optimized scheduling of tasks involving equipment used by multiple individuals, in accordance with various embodiments.

While the techniques and procedures are depicted and/or described in a certain order for purposes of illustration, it should be appreciated that certain procedures may be reordered and/or omitted within the scope of various embodiments. Moreover, while the method 400 illustrated by FIG. 4 can be implemented by or with (and, in some cases, are described below with respect to) the systems, examples, or embodiments 100, 200, 200', 200", 300, and 300' of FIGS. 1, 2A, 2B, 2C, 3A, and 3B, respectively (or components thereof), such methods may also be implemented using any suitable hardware (or software) implementation. Similarly, while each of the systems, examples, or embodiments 100, 200, 200', 200", 300, and 300' of FIGS. 1, 2A, 2B, 2C, 3A, and 3B, respectively (or components thereof), can operate according to the method 400 illustrated by FIG. 4 (e.g., by executing instructions embodied on a computer readable medium), the systems, examples, or embodiments 100, 200, 200', 200", 300, and 300' of FIGS. 1, 2A, 2B, 2C, 3A, and 3B can each also operate according to other modes of operation and/or perform other suitable procedures.

Figure 4A:
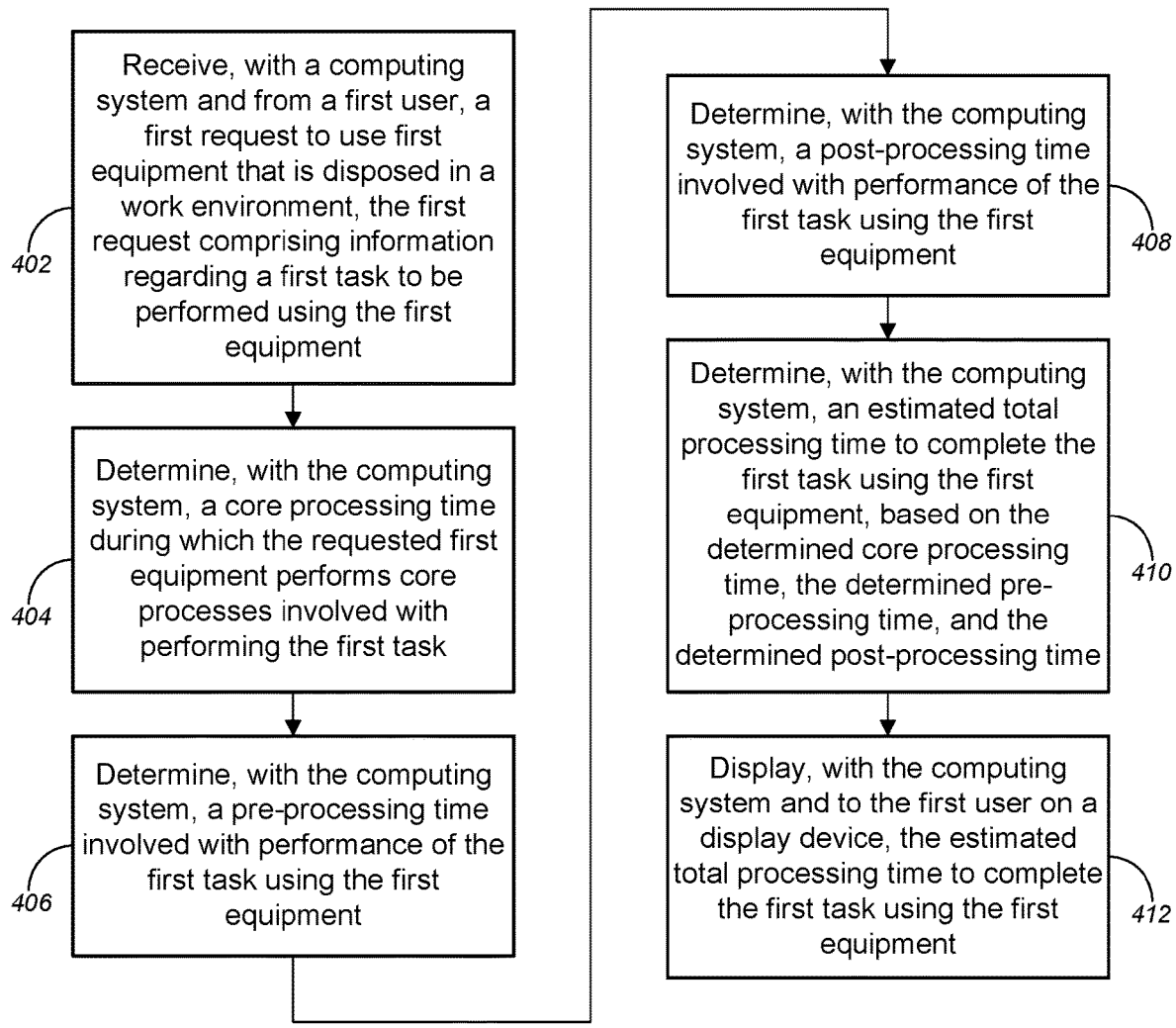
FIGS. 4A-4F are flow diagrams illustrating a method for implementing optimized scheduling of tasks involving equipment used by multiple individuals, in accordance with various embodiments.

In the non-limiting embodiment of FIG. 4A, method 400, at block 402, receiving, with a computing system and from a first user, a first request to use first equipment that is disposed in a work environment, the first request comprising information regarding a first task to be performed using the first equipment. In some embodiments, the computing system might include, without limitation, one of a computing system that is integrated with the first equipment, a computing system disposed in the work environment, a remote computing system disposed external to the work environment and accessible over a network, or a cloud computing system, and/or the like. In some cases, the work environment might include, but is not limited to, one of a laboratory, a clinic, an office, a construction site, a machine shop, a workshop, a factory, or a room, and/or the like. In some instances, the first task might include, without limitation, one of running a test sample or a tissue sample using laboratory instrumentation, solving a puzzle, assembling a piece of machinery, assembling an object, preparing a test sample or a tissue sample, identifying or tracking samples within a laboratory, instructing or guiding users regarding how to perform experimental protocols or tests in a laboratory, performing processes in a histology laboratory, performing processes in a pathologist's office, performing tasks after slide diagnosis, performing processes in a clinical or analytical laboratory, or transferring reagents or samples, and/or the like.

Merely by way of example, in some cases, the laboratory instrumentation comprises at least one of an automated clinical chemistry system, a centrifuge, a Raman spectroscopy system, an electrophoresis system, an ion mobility spectrometry ("IMS") system, a mass spectrometry ("MS") system, an inductively coupled plasma mass spectrometry ("ICP-MS") system, a gas chromatography ("GC") system, a gas chromatography mass spectrometry ("GC/MS") system, a liquid chromatography ("LC") system, a high-performance liquid chromatography ("HPLC") system, a liquid chromatography mass spectrometry ("LC/MS") system, an inductively coupled plasma atomic emission spectrometry ("ICP-AES") system, an inductively coupled plasma optical emission spectrometry ("ICP-OES") system, an atomic absorption spectrometry ("AAS") system, a microwave plasma atomic emission spectrometry ("MP-AES") system, a laser direct infrared imaging ("LDIR") system, an ultraviolet-visible ("UV-Vis") spectrophotometry system, an ultraviolet-visible-near infrared ("UV-Vis-NIR") spectrophotometry system, an electron microscopy system, a microarray scanner, a polymerase chain reaction ("PCR") instrument, a sequencing system, a cytometry system, a cell analysis system, a fluorescence and chromogenic in situ hybridization-based ("FISH/ISH") system, a sample staining system, a sample preparation system, a high vacuum system, a microlithography system, a nanolithography system, a chemical vapor deposition ("CVD") system, an ion-beam etching system, a sputtering system, an ion-beam implantation system, or a molecular beam-epitaxy system, and/or the like.

Method 400 might further comprise determining, with the computing system, a core processing time during which the requested first equipment performs core processes involved with performing the first task (block 404); determining, with the computing system, a pre-processing time involved with performance of the first task using the first equipment (block 406); determining, with the computing system, a post-processing time involved with performance of the first task using the first equipment (block 408); and determining, with the computing system, an estimated total processing time to complete the first task using the first equipment, based on the determined core processing time, the determined pre-processing time, and the determined post-processing time (block 410).

At block 412, method 400 might comprise displaying, with the computing system and to the first user on a display device, the estimated total processing time to complete the first task using the first equipment. In some cases, the display device might include, but is not limited to, one of a monitor that is communicatively coupled to the first equipment, a monitor that is communicatively coupled to the computing system, a display device that is disposed in the work environment, a display device of a laptop computer that is used by the first user, a display device of a tablet computer that is used by the first user, a display device of a smart phone that is used by the first user, a display device of a mobile phone that is used by the first user, or a display device of an augmented reality ("AR") headset that is worn by the first user, and/or the like.

Figure 4B:
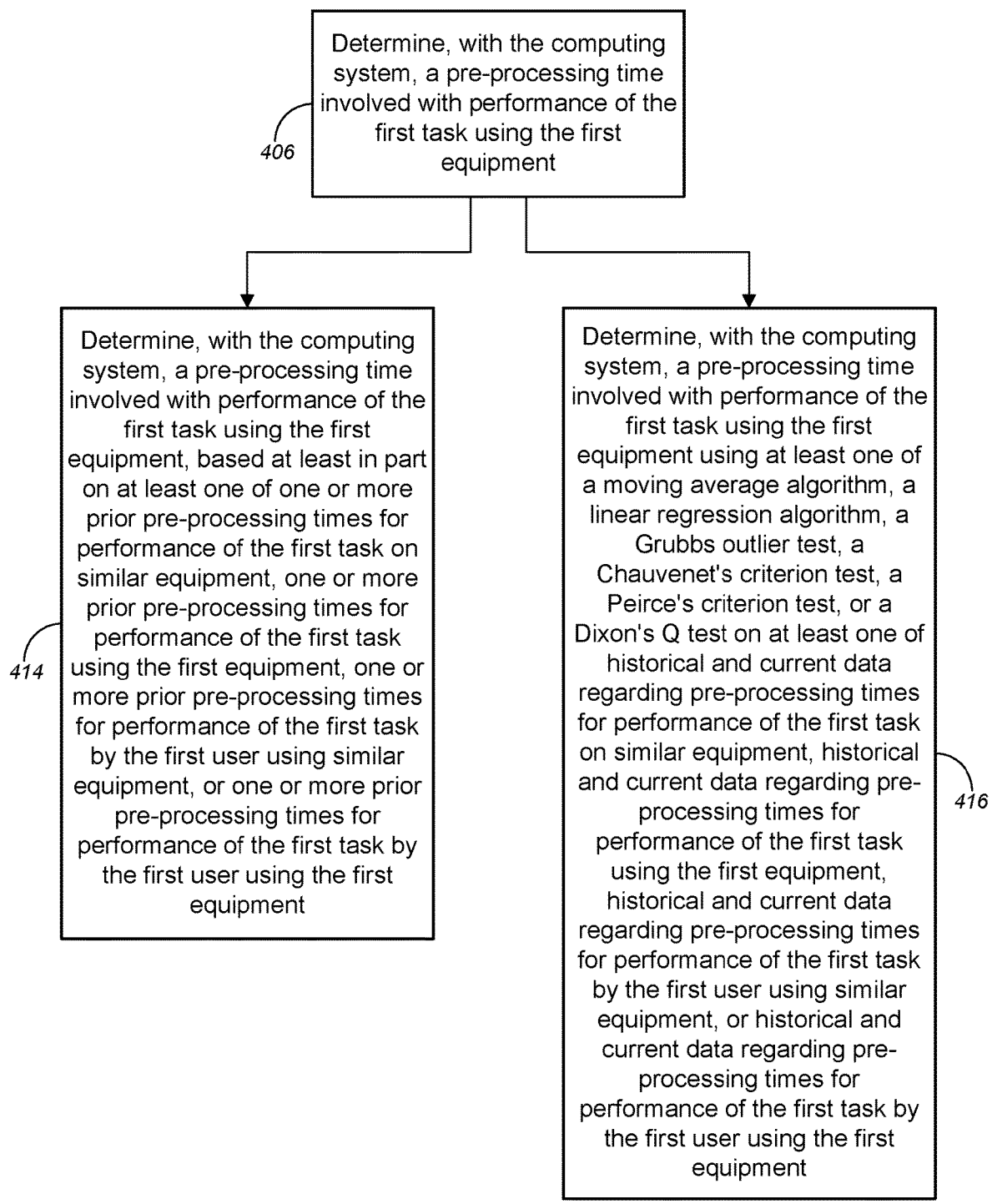

With reference to FIG. 4B, determining the pre-processing time involved with performance of the first task using the first equipment (at block 406) might comprise determining, with the computing system, a pre-processing time involved with performance of the first task using the first equipment, based at least in part on at least one of one or more prior pre-processing times for performance of the first task on similar equipment, one or more prior pre-processing times for performance of the first task using the first equipment, one or more prior pre-processing times for performance of the first task by the first user using similar equipment, or one or more prior pre-processing times for performance of the first task by the first user using the first equipment, and/or the like (block 414).

Alternatively, or additionally, determining the pre-processing time involved with performance of the first task using the first equipment (at block 406) might comprise determining, with the computing system, a pre-processing time involved with performance of the first task using the first equipment using at least one of a moving average algorithm, a linear regression algorithm, a Grubbs outlier test, a Chauvenet's criterion test, a Pierce's criterion test, or a Dixon's Q test on at least one of historical and current data regarding pre-processing times for performance of the first task on similar equipment, historical and current data regarding pre-processing times for performance of the first task using the first equipment, historical and current data regarding pre-processing times for performance of the first task by the first user using similar equipment, or historical and current data regarding pre-processing times for performance of the first task by the first user using the first equipment, and/or the like (block 416).

Figure 4C:
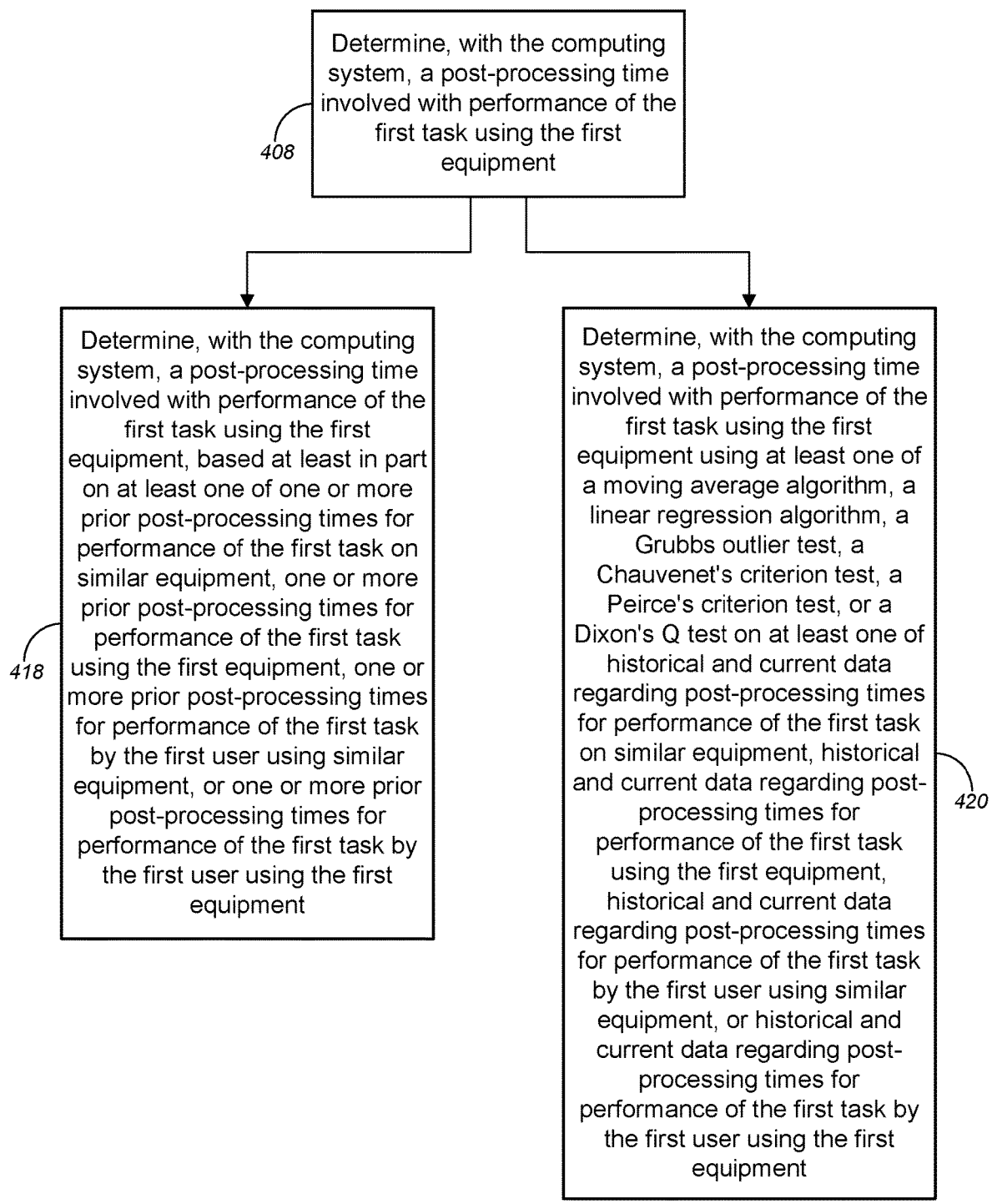

Turning to FIG. 4C, determining the post-processing time involved with performance of the first task using the first equipment (at block 408) might comprise determining, with the computing system, a post-processing time involved with performance of the first task using the first equipment, based at least in part on at least one of one or more prior post-processing times for performance of the first task on similar equipment, one or more prior post-processing times for performance of the first task using the first equipment, one or more prior post-processing times for performance of the first task by the first user using similar equipment, or one or more prior post-processing times for performance of the first task by the first user using the first equipment, and/or the like (block 418).

Alternatively, or additionally, determining the post-processing time involved with performance of the first task using the first equipment (at block 408) might comprise determining, with the computing system, a post-processing time involved with performance of the first task using the first equipment using at least one of a moving average algorithm, a linear regression algorithm, a Grubbs outlier test, a Chauvenet's criterion test, a Pierce's criterion test, or a Dixon's Q test on at least one of historical and current data regarding post-processing times for performance of the first task on similar equipment, historical and current data regarding post-processing times for performance of the first task using the first equipment, historical and current data regarding post-processing times for performance of the first task by the first user using similar equipment, or historical and current data regarding post-processing times for performance of the first task by the first user using the first equipment, and/or the like (block 420).

Figure 4D:
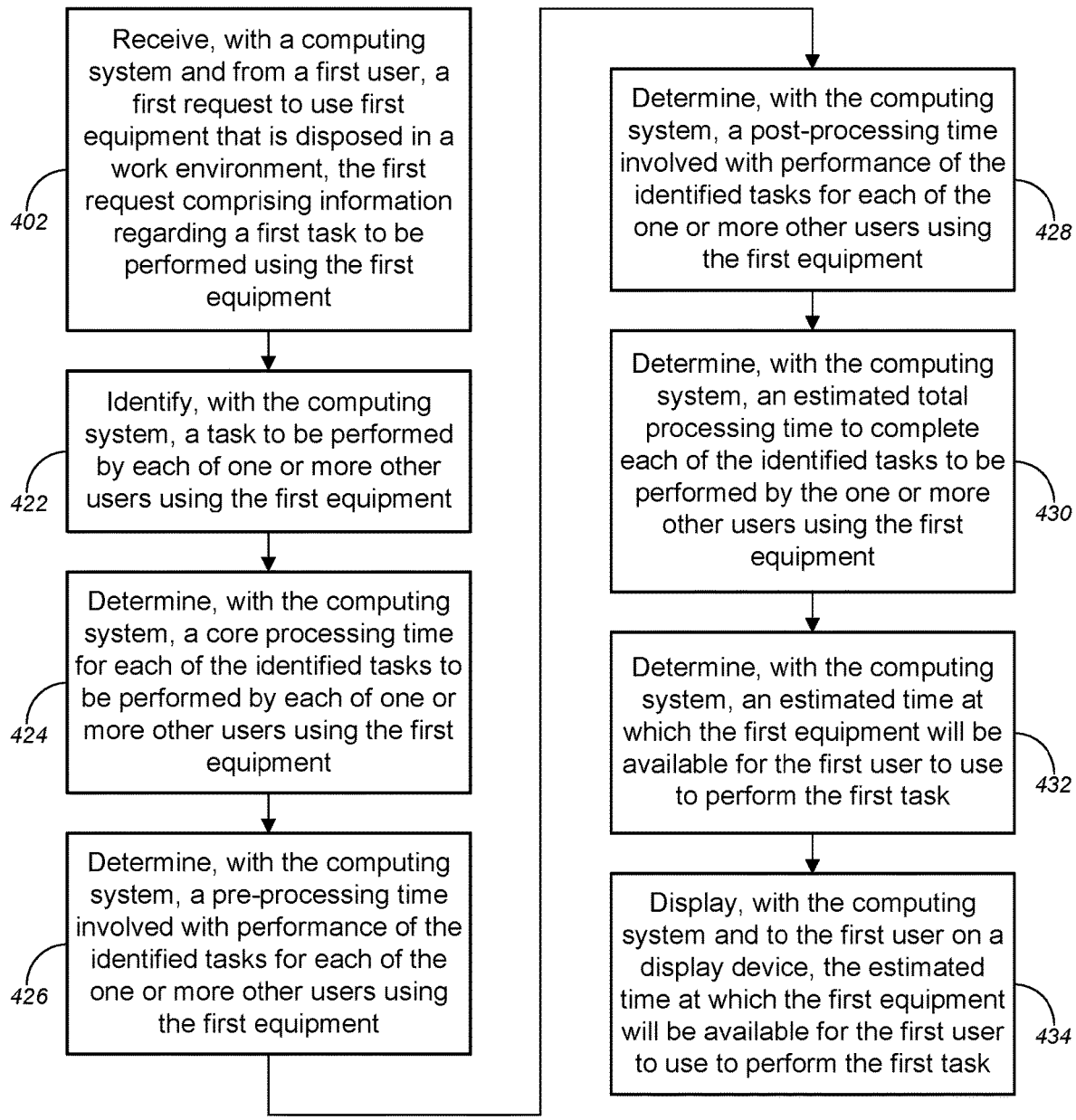

Referring to FIG. 4D, one or more other users might be scheduled to use the first equipment before the first user. Method 400 might comprise, at block 402, receiving, with a computing system and from a first user, a first request to use first equipment that is disposed in a work environment, the first request comprising information regarding a first task to be performed using the first equipment. At block 422, method 400 might comprise identifying, with the computing system, a task to be performed by each of the one or more other users using the first equipment. Method 400 might further comprise determining, with the computing system, a core processing time for each of the identified tasks to be performed by each of one or more other users using the first equipment (block 424); determining, with the computing system, a pre-processing time involved with performance of the identified tasks for each of the one or more other users using the first equipment (block 426); determining, with the computing system, a post-processing time involved with performance of the identified tasks for each of the one or more other users using the first equipment (block 428); determining, with the computing system, an estimated total processing time to complete each of the identified tasks to be performed by the one or more other users using the first equipment (block 430); and determining, with the computing system, an estimated time at which the first equipment will be available for the first user to use to perform the first task (block 432). Method 400, at block 434, might comprise displaying, with the computing system and to the first user on the display device, the estimated time at which the first equipment will be available for the first user to use to perform the first task.

Figure 4E:
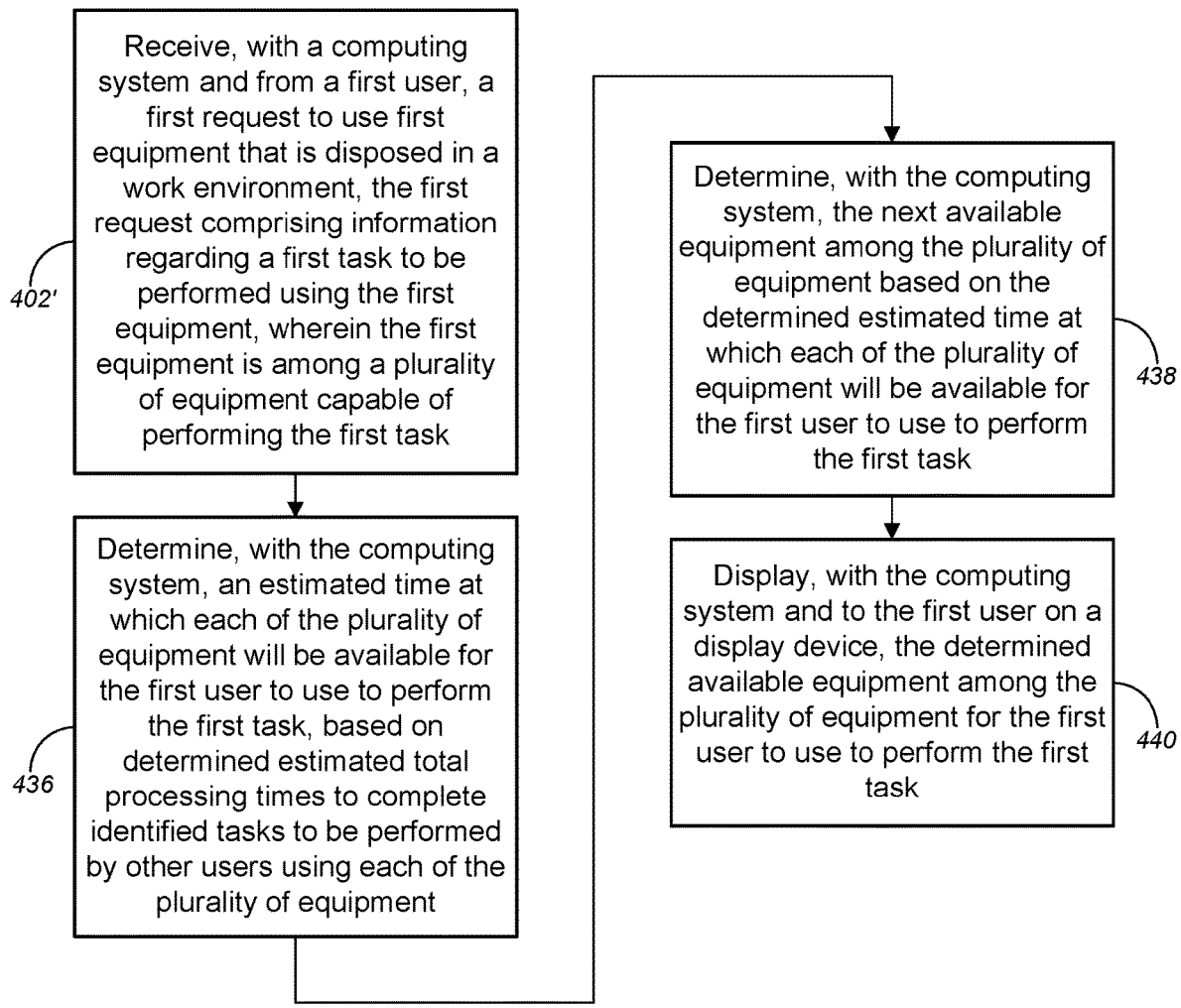

Alternatively, or additionally, with reference to FIG. 4E, method 400 might comprise, at block 402', receiving, with a computing system and from a first user, a first request to use first equipment that is disposed in a work environment, the first request comprising information regarding a first task to be performed using the first equipment, wherein the first equipment is among a plurality of equipment capable of performing the first task. Method 400 might further comprise determining, with the computing system, an estimated time at which each of the plurality of equipment will be available for the first user to use to perform the first task, based on determined estimated total processing times to complete identified tasks to be performed by other users using each of the plurality of equipment (block 436); and determining, with the computing system, the next available equipment among the plurality of equipment based on the determined estimated time at which each of the plurality of equipment will be available for the first user to use to perform the first task (block 438). At block 440, method 400 might comprise displaying, with the computing system and to the first user on the display device, the determined available equipment among the plurality of equipment for the first user to use to perform the first task.

Figure 4F:
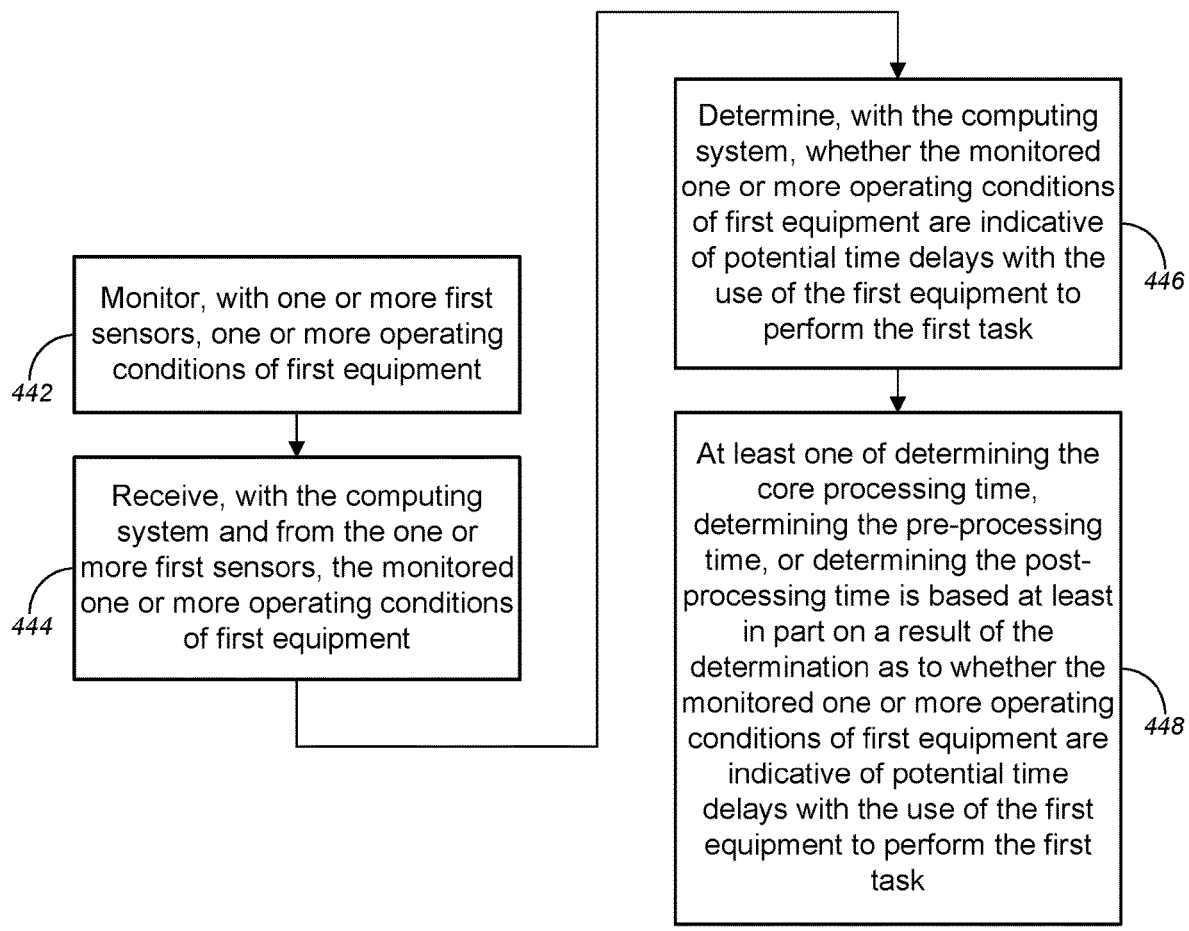

Turning to FIG. 4F, method 400 might comprise, at block 442, monitoring, with one or more first sensors, one or more operating conditions of first equipment. In some cases, monitoring the one or more operating conditions of the first equipment may be performed continuous, periodically, or in response to a user command, and/or the like. Method 400 might further comprise receiving, with the computing system and from the one or more first sensors, the monitored one or more operating conditions of first equipment (block 444); and determining, with the computing system, whether the monitored one or more operating conditions of first equipment are indicative of potential time delays with the use of the first equipment to perform the first task (block 446). At block 448, at least one of determining the core processing time, determining the pre-processing time, or determining the post-processing time might be based at least in part on a result of the determination as to whether the monitored one or more operating conditions of first equipment are indicative of potential time delays with the use of the first equipment to perform the first task. In some instances, the one or more operating conditions of first equipment might include, without limitation, at least one of pre-startup temperature, warm-up temperature, operating temperature, cool-down temperature, presence of error indicators or signals, presence of warning indicators or signals, or one or more sounds during use, and/or the like.

In some embodiments, the first task might comprise running a sample using laboratory instrumentation. The pre-processing time might include, but is not limited to, time during which at least one of the following processes occur: instrument conditioning of the first equipment, warming up of the first equipment, transferring the sample from a container to a sample preparation system, preparation of the sample using the sample preparation system, transferring the sample to the first equipment, or configuring the first equipment to perform the first task, and/or the like. The post-processing time might include, without limitation, time during which at least one of the following processes occur: transferring the sample to a container after completing the first task, cleaning the first equipment, or transferring or saving data obtained during the first task, and/or the like.

According to some embodiments, at least one of determining the core processing time, determining the pre-processing time, or determining the post-processing time may be performed using at least one of an artificial intelligence ("AI") system, a machine learning system, a learning algorithm-based system, or a neural network system to enhance computational processing by the computing system, and/or the like.

Exemplary System and Hardware Implementation

Figure 5:
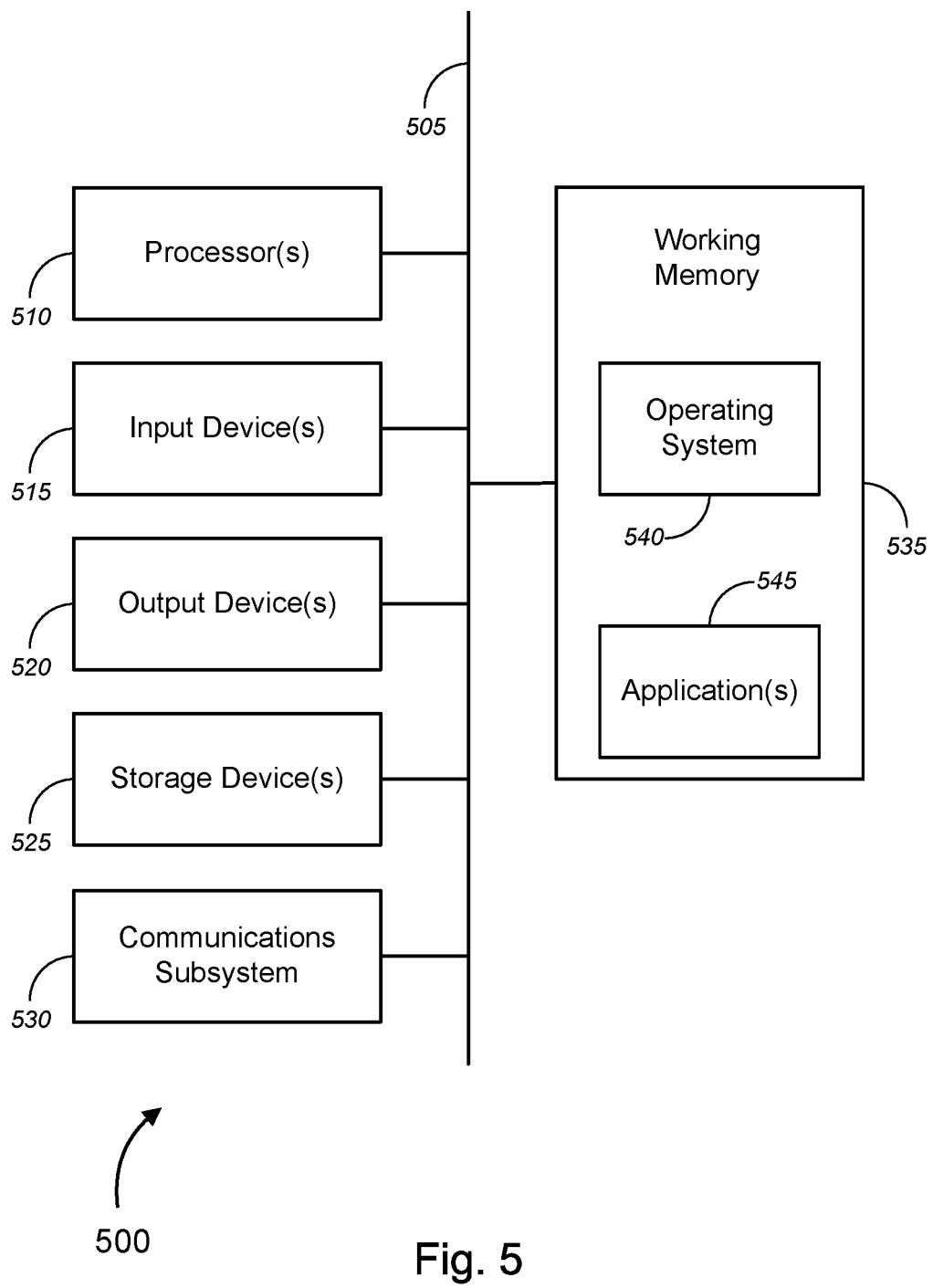
FIG. 5 is a block diagram illustrating an exemplary computer or system hardware architecture, in accordance with various embodiments.

FIG. 5 is a block diagram illustrating an exemplary computer or system hardware architecture, in accordance with various embodiments. FIG. 5 provides a schematic illustration of one embodiment of a computer system 500 of the service provider system hardware that can perform the methods provided by various other embodiments, as described herein, and/or can perform the functions of computer or hardware system (i.e., computing systems 105a and 105b, user devices 115a-115n, equipment 125a-125n, and artificial intelligence ("AI") system 140, etc.), as described above. It should be noted that FIG. 5 is meant only to provide a generalized illustration of various components, of which one or more (or none) of each may be utilized as appropriate. FIG. 5, therefore, broadly illustrates how individual system elements may be implemented in a relatively separated or relatively more integrated manner.

The computer or hardware system 500—which might represent an embodiment of the computer or hardware system (i.e., computing systems 105a and 105b, user devices 115a-115n, equipment 125a-125n, and AI system 140, etc.), described above with respect to FIGS. 1-4—is shown comprising hardware elements that can be electrically coupled via a bus 505 (or may otherwise be in communication, as appropriate). The hardware elements may include one or more processors 510, including, without limitation, one or more general-purpose processors and/or one or more special-purpose processors (such as microprocessors, digital signal processing chips, graphics acceleration processors, and/or the like); one or more input devices 515, which can include, without limitation, a mouse, a keyboard, and/or the like; and one or more output devices 520, which can include, without limitation, a display device, a printer, and/or the like.

The computer or hardware system 500 may further include (and/or be in communication with) one or more storage devices 525, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable, and/or the like. Such storage devices may be configured to implement any appropriate data stores, including, without limitation, various file systems, database structures, and/or the like.

The computer or hardware system 500 might also include a communications subsystem 530, which can include, without limitation, a modem, a network card (wireless or wired), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 530 may permit data to be exchanged with a network (such as the network described below, to name one example), with other computer or hardware systems, and/or with any other devices described herein. In many embodiments, the computer or hardware system 500 will further comprise a working memory 535, which can include a RAM or ROM device, as described above.

The computer or hardware system 500 also may comprise software elements, shown as being currently located within the working memory 535, including an operating system 540, device drivers, executable libraries, and/or other code, such as one or more application programs 545, which may comprise computer programs provided by various embodiments (including, without limitation, hypervisors, VMs, and the like), and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 525 described above. In some cases, the storage medium might be incorporated within a computer system, such as the system 500. In other embodiments, the storage medium might be separate from a computer system (i.e., a removable medium, such as a compact disc, etc.), and/or provided in an installation package, such that the storage medium can be used to program, configure, and/or adapt a general purpose computer with the instructions/code stored thereon. These instructions might take the form of executable code, which is executable by the computer or hardware system 500 and/or might take the form of source and/or installable code, which, upon compilation and/or installation on the computer or hardware system 500 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer or hardware system (such as the computer or hardware system 500) to perform methods in accordance with various embodiments of the invention. According to a set of embodiments, some or all of the procedures of such methods are performed by the computer or hardware system 500 in response to processor 510 executing one or more sequences of one or more instructions (which might be incorporated into the operating system 540 and/or other code, such as an application program 545) contained in the working memory 535. Such instructions may be read into the working memory 535 from another computer readable medium, such as one or more of the storage device(s) 525. Merely by way of example, execution of the sequences of instructions contained in the working memory 535 might cause the processor(s) 510 to perform one or more procedures of the methods described herein.

The terms "machine readable medium" and "computer readable medium," as used herein, refer to any medium that participates in providing data that causes a machine to operate in a specific fashion. In an embodiment implemented using the computer or hardware system 500, various computer readable media might be involved in providing instructions/code to processor(s) 510 for execution and/or might be used to store and/or carry such instructions/code (e.g., as signals). In many implementations, a computer readable medium is a non-transitory, physical, and/or tangible storage medium. In some embodiments, a computer readable medium may take many forms, including, but not limited to, non-volatile media, volatile media, or the like.

Non-volatile media includes, for example, optical and/or magnetic disks, such as the storage device(s) 525. Volatile media includes, without limitation, dynamic memory, such as the working memory 535. In some alternative embodiments, a computer readable medium may take the form of transmission media, which includes, without limitation, coaxial cables, copper wire, and fiber optics, including the wires that comprise the bus 505, as well as the various components of the communication subsystem 530 (and/or the media by which the communications subsystem 530 provides communication with other devices). In an alternative set of embodiments, transmission media can also take the form of waves (including without limitation radio, acoustic, and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 510 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer or hardware system 500. These signals, which might be in the form of electromagnetic signals, acoustic signals, optical signals, and/or the like, are all examples of carrier waves on which instructions can be encoded, in accordance with various embodiments of the invention.

The communications subsystem 530 (and/or components thereof) generally will receive the signals, and the bus 505 then might carry the signals (and/or the data, instructions, etc. carried by the signals) to the working memory 535, from which the processor(s) 505 retrieves and executes the instructions. The instructions received by the working memory 535 may optionally be stored on a storage device 525 either before or after execution by the processor(s) 510.

Figure 6:
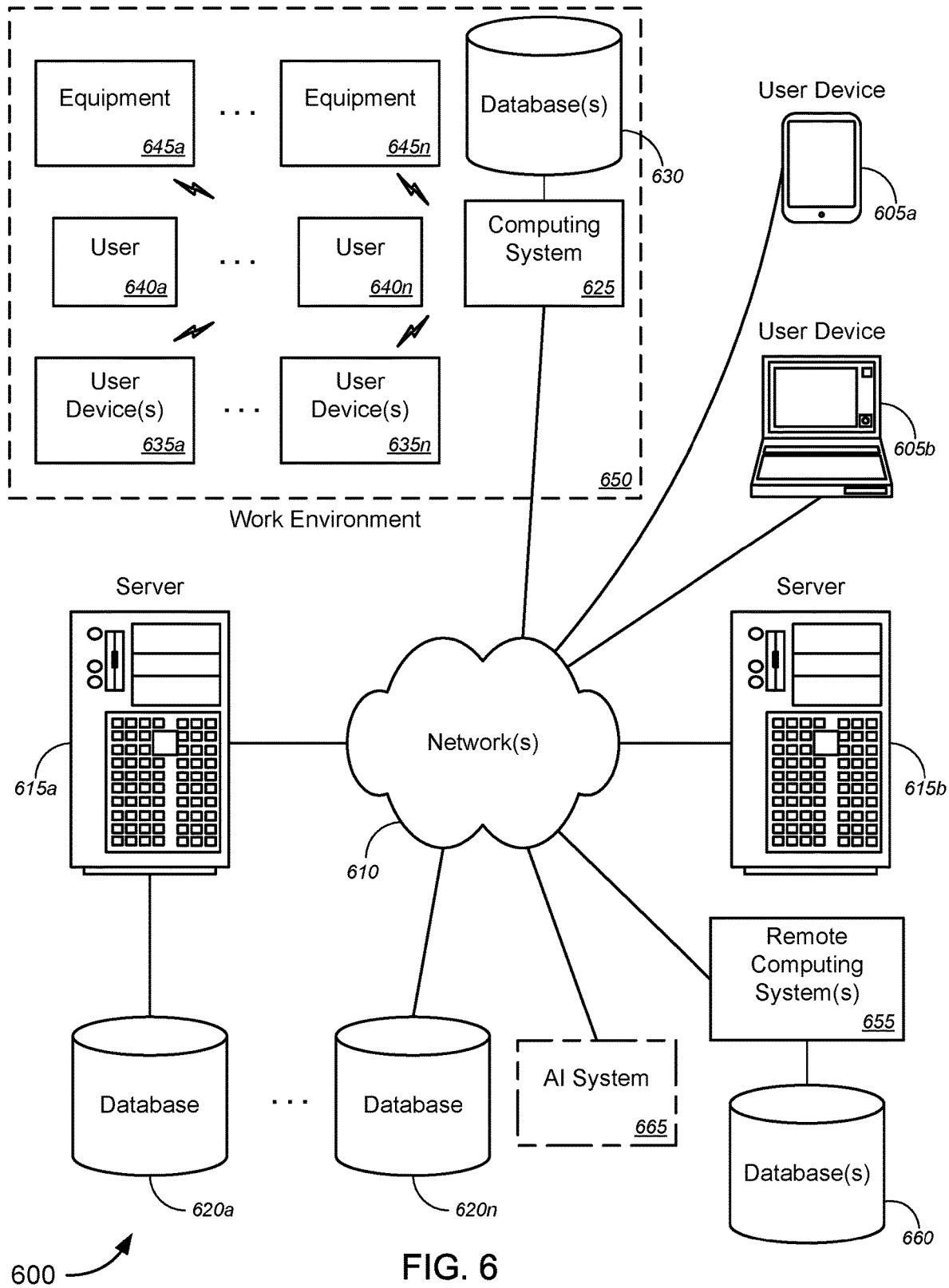
FIG. 6 is a block diagram illustrating a networked system of computers, computing systems, or system hardware architecture, which can be used in accordance with various embodiments.

As noted above, a set of embodiments comprises methods and systems for implementing task scheduling, and, more particularly, to methods, systems, and apparatuses for implementing optimized scheduling of tasks involving equipment used by multiple individuals. FIG. 6 illustrates a schematic diagram of a system 600 that can be used in accordance with one set of embodiments. The system 600 can include one or more user computers, user devices, or customer devices 605. A user computer, user device, or customer device 605 can be a general purpose personal computer (including, merely by way of example, desktop computers, tablet computers, laptop computers, handheld computers, and the like, running any appropriate operating system, several of which are available from vendors such as Apple, Microsoft Corp., and the like), cloud computing devices, a server(s), and/or a workstation computer(s) running any of a variety of commercially-available UNIX™ or UNIX-like operating systems. A user computer, user device, or customer device 605 can also have any of a variety of applications, including one or more applications configured to perform methods provided by various embodiments (as described above, for example), as well as one or more office applications, database client and/or server applications, and/or web browser applications. Alternatively, a user computer, user device, or customer device 605 can be any other electronic device, such as a thin-client computer, Internet-enabled mobile telephone, and/or personal digital assistant, capable of communicating via a network (e.g., the network(s) 610 described below) and/or of displaying and navigating web pages or other types of electronic documents. Although the exemplary system 600 is shown with two user computers, user devices, or customer devices 605, any number of user computers, user devices, or customer devices can be supported.

Certain embodiments operate in a networked environment, which can include a network(s) 610. The network(s) 610 can be any type of network familiar to those skilled in the art that can support data communications using any of a variety of commercially-available (and/or free or proprietary) protocols, including, without limitation, TCP/IP, SNA™ IPX™ AppleTalk™, and the like. Merely by way of example, the network(s) 610 (similar to network(s) 145 of FIG. 1, or the like) can each include a local area network ("LAN"), including, without limitation, a fiber network, an Ethernet network, a Token-Ring™ network, and/or the like; a wide-area network ("WAN"); a wireless wide area network ("WWAN"); a virtual network, such as a virtual private network ("VPN"); the Internet; an intranet; an extranet; a public switched telephone network ("PSTN"); an infra-red network; a wireless network, including, without limitation, a network operating under any of the IEEE 802.11 suite of protocols, the Bluetooth™ protocol known in the art, and/or any other wireless protocol; and/or any combination of these and/or other networks. In a particular embodiment, the network might include an access network of the service provider (e.g., an Internet service provider ("ISP")). In another embodiment, the network might include a core network of the service provider, and/or the Internet.

Embodiments can also include one or more server computers 615a or 615b (collectively, "servers 615" or "server computers 615" or the like). Each of the server computers 615 may be configured with an operating system, including, without limitation, any of those discussed above, as well as any commercially (or freely) available server operating systems. Each of the servers 615 may also be running one or more applications, which can be configured to provide services to one or more clients 605 and/or other servers 615.

Merely by way of example, one of the servers 615 might be a data server, a web server, a cloud computing device(s), or the like, as described above. The data server might include (or be in communication with) a web server, which can be used, merely by way of example, to process requests for web pages or other electronic documents from user computers 605. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 605 to perform methods of the invention.

The server computers 615, in some embodiments, might include one or more application servers, which can be configured with one or more applications accessible by a client running on one or more of the client computers 605 and/or other servers 615. Merely by way of example, the server(s) 615 can be one or more general purpose computers capable of executing programs or scripts in response to the user computers 605 and/or other servers 615, including, without limitation, web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including, without limitation, those commercially available from Oracle™, Microsoft™, Sybase™ IBM™, and the like, which can process requests from clients (including, depending on the configuration, dedicated database clients, API clients, web browsers, etc.) running on a user computer, user device, or customer device 605 and/or another server 615. In some embodiments, an application server can perform one or more of the processes for implementing task scheduling, and, more particularly, to methods, systems, and apparatuses for implementing optimized scheduling of tasks involving equipment used by multiple individuals, as described in detail above. Data provided by an application server may be formatted as one or more web pages (comprising HTML, JavaScript, etc., for example) and/or may be forwarded to a user computer 605 via a web server (as described above, for example). Similarly, a web server might receive web page requests and/or input data from a user computer 605 and/or forward the web page requests and/or input data to an application server. In some cases, a web server may be integrated with an application server.

In accordance with further embodiments, one or more servers 615 can function as a file server and/or can include one or more of the files (e.g., application code, data files, etc.) necessary to implement various disclosed methods, incorporated by an application running on a user computer 605 and/or another server 615. Alternatively, as those skilled in the art will appreciate, a file server can include all necessary files, allowing such an application to be invoked remotely by a user computer, user device, or customer device 605 and/or server 615.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 620a-620n (collectively, "databases 620"). The location of each of the databases 620 is discretionary: merely by way of example, a database 620a might reside on a storage medium local to (and/or resident in) a server 615a (and/or a user computer, user device, or customer device 605). Alternatively, a database 620n can be remote from any or all of the computers 605, 615, so long as it can be in communication (e.g., via the network 610) with one or more of these. In a particular set of embodiments, a database 620 can reside in a storage-area network ("SAN") familiar to those skilled in the art. (Likewise, any necessary files for performing the functions attributed to the computers 605, 615 can be stored locally on the respective computer and/or remotely, as appropriate.) In one set of embodiments, the database 620 can be a relational database, such as an Oracle database, that is adapted to store, update, and retrieve data in response to SQL-formatted commands. The database might be controlled and/or maintained by a database server, as described above, for example.

According to some embodiments, system 600 might further comprise a computing system 625 (similar to computing systems 105a and 105b of FIG. 1, or the like) and corresponding database(s) 630 (similar to database(s) 110a and 110b of FIG. 1, or the like), one or more user devices 635a-635n (collectively, "user devices 635" or the like; similar to user devices 115a-115n of FIG. 1, or the like) associated with corresponding one or more users 640a-640n (collectively, "users 640" or the like; similar to users 120a-120n of FIG. 1, or the like), and one or more equipment 645a-645n (collectively, "equipment 645" or the like; similar to equipment 125a-125n of FIG. 1, or the like), each of which may be disposed or located in work environment 650 (similar to work environment 135 of FIG. 1, or the like). System 600 might further comprise remote computing system(s) 655 (similar to remote computing system 105b of FIG. 1, or the like) and corresponding database(s) 660 (similar to database(s) 110b of FIG. 1, or the like), and, in some cases, artificial intelligence ("AI") system 665 (optional; similar to AI system 140 of FIG. 1, or the like).

In operation, a computing system might receive, from a first user 640a, a first request to use first equipment 645a that is disposed in work environment 650, the first request comprising information regarding a first task to be performed using the first equipment 645a. The computing system might determine a core processing time during which the requested first equipment 645a performs core processes involved with performing the first task. The computing system might determine a pre-processing time involved with performance of the first task using the first equipment 645a, based at least in part on at least one of one or more prior pre-processing times for performance of the first task on similar equipment, one or more prior pre-processing times for performance of the first task using the first equipment 645a, one or more prior pre-processing times for performance of the first task by the first user using similar equipment, or one or more prior pre-processing times for performance of the first task by the first user using the first equipment, and/or the like. The computing system might determine a post-processing time involved with performance of the first task using the first equipment 645a, based at least in part on at least one of one or more prior post-processing times for performance of the first task on similar equipment, one or more prior post-processing times for performance of the first task using the first equipment 645a, one or more prior post-processing times for performance of the first task by the first user using similar equipment, or one or more prior post-processing times for performance of the first task by the first user using the first equipment 645a, and/or the like. The computing system might determine an estimated total processing time to complete the first task using the first equipment 645a, based on the determined core processing time, the determined pre-processing time, and the determined post-processing time. The computing system might display, to the first user 640a on a display device (e.g., display device on user device(s) 605a, 605b, or 635a-635n, or the like), the estimated total processing time to complete the first task using the first equipment 645a.

In some embodiments, the computing system might include, without limitation, one of a computing system that is integrated with the first equipment 645a, a computing system 625 disposed in the work environment 650, a remote computing system disposed external to the work environment and accessible over a network (e.g., server 615a, 615b, or remote computing system(s) 655, or the like), or a cloud computing system, and/or the like. In some cases, the display device might include, but is not limited to, one of a monitor that is communicatively coupled to the first equipment 645a, a monitor that is communicatively coupled to the computing system 625, a display device that is disposed in the work environment 650, a display device of a laptop computer 605b that is used by the first user, a display device of a tablet computer 605a that is used by the first user, a display device of a smart phone (e.g., one of user device(s) 635a-635n, or the like) that is used by the first user, a display device of a mobile phone (e.g., one of user device(s) 635a-635n, or the like) that is used by the first user, or a display device of an augmented reality ("AR") headset (e.g., one of user device(s) 635a-635n, or the like) that is worn by the first user, and/or the like. In some instances, the work environment might include, without limitation, one of a laboratory, a clinic, an office, a construction site, a machine shop, a workshop, a factory, or a room, and/or the like.

According to some embodiments, the first task might include, but is not limited to, one of running a test sample or a tissue sample using laboratory instrumentation, solving a puzzle, assembling a piece of machinery, assembling an object, preparing a test sample or a tissue sample, identifying or tracking samples within a laboratory, instructing or guiding users regarding how to perform experimental protocols or tests in a laboratory, performing processes in a histology laboratory, performing processes in a pathologist's office, performing tasks after slide diagnosis, performing processes in a clinical or analytical laboratory, or transferring reagents or samples, and/or the like. In some cases, the laboratory instrumentation might include, without limitation, at least one of an automated clinical chemistry system, a centrifuge, a Raman spectroscopy system, an electrophoresis system, an ion mobility spectrometry ("IMS") system, a mass spectrometry ("MS") system, an inductively coupled plasma mass spectrometry ("ICP-MS") system, a gas chromatography ("GC") system, a gas chromatography mass spectrometry ("GC/MS") system, a liquid chromatography ("LC") system, a high-performance liquid chromatography ("HPLC") system, a liquid chromatography mass spectrometry ("LC/MS") system, an inductively coupled plasma atomic emission spectrometry ("ICP-AES") system, an inductively coupled plasma optical emission spectrometry ("ICP-OES") system, an atomic absorption spectrometry ("AAS") system, a microwave plasma atomic emission spectrometry ("MP-AES") system, a laser direct infrared imaging ("LDIR") system, an ultraviolet-visible ("UV-Vis") spectrophotometry system, an ultraviolet-visible-near infrared ("UV-Vis-NIR") spectrophotometry system, an electron microscopy system, a microarray scanner, a polymerase chain reaction ("PCR") instrument, a sequencing system, a cytometry system, a cell analysis system, a fluorescence and chromogenic in situ hybridization-based ("FISH/ISH") system, a sample staining system, a sample preparation system, a high vacuum system, a microlithography system, a nanolithography system, a chemical vapor deposition ("CVD") system, an ion-beam etching system, a sputtering system, an ion-beam implantation system, or a molecular beam-epitaxy system, and/or the like.

Merely by way of example, in some instances, at least one of determining the core processing time, determining the pre-processing time, or determining the post-processing time may be performed using at least one of an artificial intelligence ("AI") system, a machine learning system, a learning algorithm-based system, or a neural network system, and/or the like, to enhance computational processing by the computing system.

In some embodiments, one or more first sensors (not shown) might monitor one or more operating conditions of first equipment 645a. The computing system might receive, from the one or more first sensors, the monitored one or more operating conditions of first equipment 645a, and might determine whether the monitored one or more operating conditions of first equipment 645a are indicative of potential time delays with the use of the first equipment 645a to perform the first task. At least one of determining the core processing time, determining the pre-processing time, or determining the post-processing time might be based at least in part on a result of the determination as to whether the monitored one or more operating conditions of first equipment 645a are indicative of potential time delays with the use of the first equipment 645a to perform the first task. In some cases, monitoring the one or more operating conditions of the first equipment might be performed continuous, periodically, or in response to a user command, and/or the like. In some instances, the one or more operating conditions of first equipment might include, without limitation, at least one of pre-startup temperature, warm-up temperature, operating temperature, cool-down temperature, presence of error indicators or signals, presence of warning indicators or signals, or one or more sounds during use, and/or the like.

According to some embodiments, one or more other users 640b-640n might be scheduled to use the first equipment 645a before the first user 640a. In such embodiments, the computing system might identify a task to be performed by each of the one or more other users 640b-640n using the first equipment 645a; might determine a core processing time for each of the identified tasks to be performed by each of one or more other users 640b-640n using the first equipment 645a; might determine a pre-processing time involved with performance of the identified tasks for each of the one or more other users 640b-640n using the first equipment 645a; might determine a post-processing time involved with performance of the identified tasks for each of the one or more other users 640b-640n using the first equipment 645a; might determine an estimated total processing time to complete each of the identified tasks to be performed by the one or more other users 640b-640n using the first equipment 645a; might determine an estimated time at which the first equipment 645a will be available for the first user 640a to use to perform the first task; and might display, to the first user 640a on the display device, the estimated time at which the first equipment 645a will be available for the first user 640a to use to perform the first task.

In some embodiments, the computing system might determine an estimated time at which each of the plurality of equipment 645a-645n will be available for the first user 640a to use to perform the first task, based on determined estimated total processing times to complete identified tasks to be performed by other users 640b-640n using each of the plurality of equipment 645a-645n. The computing system might determine the next available equipment 645 among the plurality of equipment 645a-645n based on the determined estimated time at which each of the plurality of equipment 645a-645n will be available for the first user 640a to use to perform the first task. The computing system might display, to the first user 640a on the display device, the determined available equipment 645 among the plurality of equipment 645a-645n for the first user 640a to use to perform the first task.

These and other functions of the system 600 (and its components) are described in greater detail above with respect to FIGS. 1-4.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method, comprising:
   receiving, with a computing system and from a first user, a first request to use first equipment that is disposed in a work environment, the first request comprising information regarding a first task to be performed using the first equipment;
   determining, with the computing system, a core processing time during which the requested first equipment performs core processes involved with performing the first task;
   determining, with the computing system, a pre-processing time involved with performance of the first task using the first equipment;
   determining, with the computing system, a post-processing time involved with performance of the first task using the first equipment;
   determining, with the computing system, an estimated total processing time to complete the first task using the first equipment, based on the determined core processing time, the determined pre-processing time, and the determined post-processing time;
   displaying, with the computing system and to the first user on a display device, the estimated total processing time to complete the first task using the first equipment, wherein the first equipment is among a plurality of equipment capable of performing the first task;
   determining, with the computing system, an estimated time at which each of the plurality of equipment will be available for the first user to use to perform the first task, based on determined estimated total processing times to complete identified tasks to be performed by other users using each of the plurality of equipment;
   coordinating and scheduling, using the computing system, use of the first equipment that is disposed in the work environment; and
   controlling, using the computing system, the first equipment and preparation of resources, based on the coordination and scheduling, wherein the controlling includes at least one of sending a signal to the first equipment to turn on the first equipment for a specified warm-up time, or sending a signal to the first equipment to adjust a sample preparation time to condition a sample.

2. The method of claim 1, wherein the computing system comprises one of a computing system that is integrated with the first equipment, a computing system disposed in the work environment, a remote computing system disposed external to the work environment and accessible over a network, or a cloud computing system.

3. The method of claim 1, wherein the display device comprises one of a monitor that is communicatively coupled to the first equipment, a monitor that is communicatively coupled to the computing system, a display device that is disposed in the work environment, a display device of a laptop computer that is used by the first user, a display device of a tablet computer that is used by the first user, a display device of a smart phone that is used by the first user, a display device of a mobile phone that is used by the first user, or a display device of an augmented reality ("AR") headset that is worn by the first user.

4. The method of claim 1, wherein the work environment comprises one of a laboratory, a clinic, an office, a construction site, a machine shop, a workshop, a factory, or a room.

5. The method of claim 1, wherein the first task comprises one of running a test sample or a tissue sample using laboratory instrumentation, solving a puzzle, assembling a piece of machinery, assembling an object, preparing a test sample or a tissue sample, identifying or tracking samples within a laboratory, instructing or guiding users regarding how to perform experimental protocols or tests in a laboratory, performing processes in a histology laboratory, performing processes in a pathologist's office, performing tasks after slide diagnosis, performing processes in a clinical or analytical laboratory, or transferring reagents or samples.

6. The method of claim 5, wherein the laboratory instrumentation comprises at least one of an automated clinical chemistry system, a centrifuge, a Raman spectroscopy system, an electrophoresis system, an ion mobility spectrometry ("IMS") system, a mass spectrometry ("MS") system, an inductively coupled plasma mass spectrometry ("ICP-MS") system, a gas chromatography ("GC") system, a gas chromatography mass spectrometry ("GC/MS") system, a liquid chromatography ("LC") system, a high-performance liquid chromatography ("HPLC") system, a liquid chromatography mass spectrometry ("LC/MS") system, an inductively coupled plasma atomic emission spectrometry ("ICP-AES") system, an inductively coupled plasma optical emission spectrometry ("ICP-OES") system, an atomic absorption spectrometry ("AAS") system, a microwave plasma atomic emission spectrometry ("MP-AES") system, a laser direct infrared imaging ("LDIR") system, an ultraviolet-visible ("UV-Vis") spectrophotometry system, an ultraviolet-visible-near infrared ("UV-Vis-NIR") spectrophotometry system, an electron microscopy system, a microarray scanner, a polymerase chain reaction ("PCR") instrument, a sequencing system, a cytometry system, a cell analysis system, a fluorescence and chromogenic in situ hybridization-based ("FISH/ISH") system, a sample staining system, a sample preparation system, a high vacuum system, a microlithography system, a nanolithography system, a chemical vapor deposition ("CVD") system, an ion-beam etching system, a sputtering system, an ion-beam implantation system, or a molecular beam-epitaxy system.

7. The method of claim 1, wherein the first task comprises running the sample using laboratory instrumentation, wherein the pre-processing time comprises time during which at least one of the following processes occur: instrument conditioning of the first equipment, warming up of the first equipment, transferring the sample from a container to a sample preparation system, preparation of the sample using the sample preparation system, transferring the sample to the first equipment, or configuring the first equipment to perform the first task.

8. The method of claim 1, wherein the first task comprises running the sample using laboratory instrumentation, wherein the post-processing time comprises time during which at least one of the following processes occur: transferring the sample to a container after completing the first task, cleaning the first equipment, or transferring or saving data obtained during the first task.

9. The method of claim 1, wherein determining the pre-processing time involved with performance of the first task using the first equipment comprises determining, with the computing system, a pre-processing time involved with performance of the first task using the first equipment, based at least in part on at least one of one or more prior pre-processing times for performance of the first task on similar equipment, one or more prior pre-processing times for performance of the first task using the first equipment, one or more prior pre-processing times for performance of the first task by the first user using similar equipment, or one or more prior pre-processing times for performance of the first task by the first user using the first equipment.

10. The method of claim 9, wherein determining the pre-processing time involved with performance of the first task using the first equipment comprises using at least one of a moving average algorithm, a linear regression algorithm, a Grubbs outlier test, a Chauvenet's criterion test, a Pierce's criterion test, or a Dixon's Q test on at least one of historical and current data regarding pre-processing times for performance of the first task on similar equipment, historical and current data regarding pre-processing times for performance of the first task using the first equipment, historical and current data regarding pre-processing times for performance of the first task by the first user using similar equipment, or historical and current data regarding pre-processing times for performance of the first task by the first user using the first equipment.

11. The method of claim 1, wherein determining the post-processing time involved with performance of the first task using the first equipment comprises determining, with the computing system, a post-processing time involved with performance of the first task using the first equipment, based at least in part on at least one of one or more prior post-processing times for performance of the first task on similar equipment, one or more prior post-processing times for performance of the first task using the first equipment, one or more prior post-processing times for performance of the first task by the first user using similar equipment, or one or more prior post-processing times for performance of the first task by the first user using the first equipment.

12. The method of claim 11, wherein determining the post-processing time involved with performance of the first task using the first equipment comprises using at least one of a moving average algorithm, a linear regression algorithm, a Grubbs outlier test, a Chauvenet's criterion test, a Pierce's criterion test, or a Dixon's Q test on at least one of historical and current data regarding post-processing times for performance of the first task on similar equipment, historical and current data regarding post-processing times for performance of the first task using the first equipment, historical and current data regarding post-processing times for performance of the first task by the first user using similar equipment, or historical and current data regarding post-processing times for performance of the first task by the first user using the first equipment.

13. The method of claim 1, wherein at least one of determining the core processing time, determining the pre-processing time, or determining the post-processing time is performed using at least one of an artificial intelligence ("AI") system, a machine learning system, a learning algorithm-based system, or a neural network system to enhance computational processing by the computing system.

14. The method of claim 1, further comprising:
monitoring, with one or more first sensors, one or more operating conditions of first equipment;
receiving, with the computing system and from the one or more first sensors, the monitored one or more operating conditions of first equipment; and
determining, with the computing system, whether the monitored one or more operating conditions of first equipment are indicative of potential time delays with the use of the first equipment to perform the first task, wherein at least one of determining the core processing time, determining the pre-processing time, or determining the post-processing time is based at least in part on a result of the determination as to whether the monitored one or more operating conditions of first equipment are indicative of potential time delays with the use of the first equipment to perform the first task.

15. The method of claim 14, wherein the one or more operating conditions of first equipment comprise at least one of pre-startup temperature, warm-up temperature, operating temperature, cool-down temperature, presence of error indicators or signals, presence of warning indicators or signals, or one or more sounds during use.

16. The method of claim 1, wherein one or more other users are scheduled to use the first equipment before the first user, wherein the method further comprises:
identifying, with the computing system, a task to be performed by each of the one or more other users using the first equipment;
determining, with the computing system, a core processing time for each of the identified tasks to be performed by each of one or more other users using the first equipment;
determining, with the computing system, a pre-processing time involved with performance of the identified tasks for each of the one or more other users using the first equipment;
determining, with the computing system, a post-processing time involved with performance of the identified tasks for each of the one or more other users using the first equipment;
determining, with the computing system, an estimated total processing time to complete each of the identified tasks to be performed by the one or more other users using the first equipment;
determining, with the computing system, an estimated time at which the first equipment will be available for the first user to use to perform the first task; and displaying, with the computing system and to the first user on the display device, the estimated time at which the first equipment will be available for the first user to use to perform the first task.

17. The method of claim 1, wherein the method further comprises:
   determining, with the computing system, the next available equipment among the plurality of equipment based on the determined estimated time at which each of the plurality of equipment will be available for the first user to use to perform the first task; and
   displaying, with the computing system and to the first user on the display device, the determined available equipment among the plurality of equipment for the first user to use to perform the first task.

18. An apparatus, comprising:
   at least one processor; and
   a non-transitory computer readable medium communicatively coupled to the at least one processor, the non-transitory computer readable medium having stored thereon computer software comprising a set of instructions that, when executed by the at least one processor, causes the apparatus to:
      receive, from a first user, a first request to use first equipment that is disposed in a work environment, the first request comprising information regarding a first task to be performed using the first equipment;
      determine a core processing time during which the requested first equipment performs core processes involved with performing the first task;
      determine a pre-processing time involved with performance of the first task using the first equipment;
      determine a post-processing time involved with performance of the first task using the first equipment;
      determine an estimated total processing time to complete the first task using the first equipment, based on the determined core processing time, the determined pre-processing time, and the determined post-processing time;
      display, to the first user on a display device, the estimated total processing time to complete the first task using the first equipment, wherein the first equipment is among a plurality of equipment capable of performing the first task;
      determine an estimated time at which each of the plurality of equipment will be available for the first user to use to perform the first task, based on determined estimated total processing times to complete identified tasks to be performed by other users using each of the plurality of equipment;
      coordinate and schedule use of the first equipment that is disposed in the work environment; and
      control the first equipment and preparation of resources, based on the coordination and scheduling, by at least one of sending a signal to the first equipment to turn on the first equipment for a specified warm-up time, or sending a signal to the first equipment to adjust a sample preparation time to condition a sample.

19. A system, comprising:
   a computing system, comprising:
      at least one first processor; and
      a first non-transitory computer readable medium communicatively coupled to the at least one first processor, the first non-transitory computer readable medium having stored thereon computer software comprising a first set of instructions that, when executed by the at least one first processor, causes the computing system to:
         receive, from a first user, a first request to use first equipment that is disposed in a work environment, the first request comprising information regarding a first task to be performed using the first equipment;
         determine a core processing time during which the requested first equipment performs core processes involved with performing the first task;
         determine a pre-processing time involved with performance of the first task using the first equipment;
         determine a post-processing time involved with performance of the first task using the first equipment;
         determine an estimated total processing time to complete the first task using the first equipment, based on the determined core processing time, the determined pre-processing time, and the determined post-processing time;
         display, to the first user on a display device, the estimated total processing time to complete the first task using the first equipment, wherein the first equipment is among a plurality of equipment capable of performing the first task;
         determine an estimated time at which each of the plurality of equipment will be available for the first user to use to perform the first task, based on determined estimated total processing times to complete identified tasks to be performed by other users using each of the plurality of equipment;
         coordinate and schedule use of the first equipment that is disposed in the work environment; and
         control the first equipment and preparation of resources, based on the coordination and scheduling, by at least one of sending a signal to the first equipment to turn on the first equipment for a specified warm-up time, or sending a signal to the first equipment to adjust a sample preparation time to condition a sample.

* * * * *